(12) United States Patent
Kim et al.

(10) Patent No.: US 8,409,516 B2
(45) Date of Patent: Apr. 2, 2013

(54) MONOLITH, CATALYST CONVERTOR FOR PURIFYING EXHAUST GAS USING THE SAME AND METHOD FOR MANUFACTURING THE CATALYST CONVERTOR

(75) Inventors: Myoung Soo Kim, Seoul (KR); Jae Yeong Lee, Goyang-si (KR); Hyun Chul Lim, Gwangmyeong-si (KR); Sang Dong Jeong, Gimpo-si (KR); Yong Sul Song, Seoul (KR); Sung Chul Yang, Seoul (KR)

(73) Assignee: Amo Co., Ltd. (KR)

( * ) Notice: Subject to any disclaimer, the term of this patent is extended or adjusted under 35 U.S.C. 154(b) by 337 days.

(21) Appl. No.: 12/678,409

(22) PCT Filed: Sep. 17, 2008

(86) PCT No.: PCT/KR2008/005482
§ 371 (c)(1),
(2), (4) Date: Mar. 16, 2010

(87) PCT Pub. No.: WO2009/038335
PCT Pub. Date: Mar. 26, 2009

(65) Prior Publication Data
US 2010/0212302 A1    Aug. 26, 2010

(30) Foreign Application Priority Data

| Sep. 18, 2007 | (KR) | 10-2007-0094639 |
| Jan. 25, 2008 | (KR) | 10-2008-0008059 |
| May 30, 2008 | (KR) | 10-2008-0051107 |
| Aug. 12, 2008 | (KR) | 10-2008-0078788 |

(51) Int. Cl.
*B01D 50/00*    (2006.01)

(52) U.S. Cl. ............ 422/173; 422/177; 422/180
(58) Field of Classification Search .......... 422/174, 422/177, 180
See application file for complete search history.

(56) References Cited

U.S. PATENT DOCUMENTS

| 5,427,601 | A | * | 6/1995 | Harada et al. | 75/235 |
| 5,562,885 | A | * | 10/1996 | Bayer et al. | 422/174 |
| 6,712,869 | B2 | * | 3/2004 | Cheng et al. | 55/418 |
| 6,919,052 | B2 | * | 7/2005 | Foster et al. | 422/179 |

FOREIGN PATENT DOCUMENTS

| JP | 07-279652 | 10/1995 |
| JP | 10-066953 | 3/1998 |

(Continued)

OTHER PUBLICATIONS

International Search Report—PCT/KR2008/005482 dated Mar. 26, 2009.

*Primary Examiner* — Tom Duong
(74) *Attorney, Agent, or Firm* — Cantor Colburn LLP

(57) ABSTRACT

Provided is a catalyst converter for purifying exhaust gas and a method for manufacturing the catalyst converter, in which a heater is disposed between inner/outer monoliths, to thereby heighten a heat transfer efficiency and induce a uniform catalytic reaction, and to thereby enhance a processing performance, and minimize an electric power consumption and miniaturize a device. The catalyst converter includes: a heater having a winding portion which is wound so as to have a space therein and a pair of electric power terminals; inner and outer monoliths which are inserted in the inner and outer circumferential portions of the heater winding portion wherein each of the inner and outer monoliths includes a number of hollow cells on the surfaces of which catalysts have been coated and which are formed in the lengthy direction; and a housing in which a support assembly is assembled.

7 Claims, 16 Drawing Sheets

FOREIGN PATENT DOCUMENTS

| | | |
|---|---|---|
| JP | 2002-143693 | 5/2002 |
| JP | 2005-313083 | 11/2005 |
| KR | 10-2001-0039702 | 5/2001 |
| KR | 10-2003-0086085 | 11/2003 |
| KR | 10-0499725 | 6/2005 |
| KR | 10-0775907 | 11/2007 |

* cited by examiner

MONOLITH, CATALYST CONVERTOR FOR PURIFYING EXHAUST GAS USING THE SAME AND METHOD FOR MANUFACTURING THE CATALYST CONVERTOR

TECHNICAL FIELD

This invention relates to a catalyst support called a monolith, a catalyst support converter called a catalyst converter for purifying exhaust gas using the same, and a method for manufacturing the catalyst converter, and more particularly, to a catalyst converter for purifying exhaust gas and a method for manufacturing the catalyst converter, in which a heater is disposed between inner/outer monoliths, to thereby heighten a heat transfer efficiency and induce a uniform catalytic reaction, and to thereby enhance a processing performance, and minimize an electric power consumption and miniaturize a device.

BACKGROUND ART

Because food trashes contain high moisture contents and are easily rotten, it is difficult to treat them in reclamation and incineration. Therefore, these food trashes are collected together, and the collected food trashes are specially, physically and chemically processed, to thereby attempt to obtain waste reduction or try to recycle the food trashes into resources.

However, household food trash processing devices which are arranged in respective home kitchens have been recently developed for the convenience of the apartment house dweller or the old and the weak, and are widely prevailed. These household food trash processing devices reduce volume of food trashes in minimum size by passing through dehydration, crush, high-temperature dry, fermentation, decomposition, etc. and discharge the minimized volume of the food trashes.

These household food trash processing devices generate a massive amount of exhaust gas including an offensive odor that happens at the time of fermentation and decomposition of organic matters that occupy most of food trashes. Accordingly, in the case that these household food trash processing devices are mobile, it is essential to install a deodorization device to deodorize an offensive odor compulsorily in an exhaust unit. Meanwhile, in the case that these household food trash processing devices are fixed, exhaust gas is discharged through a drain.

A deodorization method using microbes, an activated carbon absorption method using activated carbon and an oxidation catalyst combustion method using an oxidation catalyst are used for conventional deodorization devices.

The microorganism deodorization method requires for a long process time, needs a persistent optimum condition to use microorganism, and requires for a periodic control. Meanwhile, since the activated carbon absorption method requires periodic replacement of activated carbon per 2 or 3 months and requires much process time, it is suitable to a small capacity device having less exhaust gas.

The deodorization method that uses an oxidation catalyst removes an offensive odor by making exhaust gas passing through a honey comb support that has a number of hollow cells in which a catalyst has been coated. Here, a heater is provided in a deodorization device so that the catalyst can react effectively with a material that induces an offensive odor, and thus heats a catalyst support at a catalyst activity temperature. The deodorization method that uses this catalyst may be used semi-permanently, and may be applied to a place where a processing capacity is big because the processing speed is high.

In the case of the deodorization device that uses the oxidation catalyst, the heater may be divided into a direct heating system in which a heater is integrally formed with a support, and an indirect heating system in which a heater is separated from a support by a predetermined distance.

As illustrated in FIG. 1, a conventional deodorization device 1 employing an indirect heating method includes an entrance 12 and an exit 14 at both sides of the conventional deodorization device 1. The conventional deodorization device 1 has a structure that a heater 16 is arranged at the entrance side of a cylindrical housing 10 which has a flow path 11 through which exhaust gas passes therein, and a honey comb support 18 having a structure of a number of hollow cells on the surfaces of which a catalyst has been coated is arranged at the rear end of the heater 16.

In the case of the conventional deodorization device 1, exhaust gas including an offensive odor passes through a number of hollow cells of a honey comb support in which the catalyst has been coated, at a state where the honey comb support 18 having a number of hollow cells in which the catalyst has been coated is heated by a heater 16 up to a catalyst activation temperature, for example, at 300-450° C., and the exhaust gas reacts with the catalyst for combustion. Accordingly, the deodorized exhaust gas is discharged via the exit 14.

In the case of the conventional deodorization devices of the above-described structures, a "U" shaped heater is disclosed in the Korean patent laid-open publication No. 2001-39702, a conical coil shaped heater which are converged consecutively from upstream to downstream is disclosed in the Korean patent No. 499725, and a coil shaped heater is disclosed in the Korean patent No. 775907. In addition, the Japanese patent laid-open publication No. 10-66953 discloses a structure that platinum supported catalyst honey comb supports are arranged in two stages in a protective tube and a bar type platinum supported heater is arranged at the front end of the platinum supported catalyst honey comb supports, respectively.

However, in the case that the above-described heaters are arranged at the rear end of the support where catalyst has been coated, the rear end of the support does not reach the catalyst activation temperature. As a result, there is a problem that effective deodorization is not achieved. Even if the rear end of the support is heated by the heater so that it may reach the catalyst activation temperature, unnecessary power consumption increases.

Meanwhile, a conventional deodorization device employing a direct heating method is disclosed in the Korean patent laid-open publication No. 2003-86085, in which a heater is arranged at the center of a spiral plate on which a metal catalyst has been coated. However, the support structure has a problem that a surface area that exhaust gas contacts is relatively smaller than that of a honey comb support structure.

As described above, the deodorization device using the heater of the indirect heating method in the catalyst support of the honey comb structure has advantages that a surface area on which a catalyst has been coated is large and introduced exhaust gas may be heated in advance, but has disadvantages that a contact time when the introduced exhaust gas contacts the catalyst is not enough in the case that velocity of a flow is fast, and thus the introduced exhaust gas is not oxidized (decomposed) or an energy efficiency drops. Meanwhile, the deodorization device using the heater of the direct heating method in the disc shaped support having a spiral plate or a partial opening portion has advantages of a simple structure and a low ventilation resistance but has disadvantages that a surface area on which a catalyst has been coated is small and introduced exhaust gas may not be heated in advance.

In addition, a low capacity heater may not be used in a general deodorization device fundamentally, and it is hard to minimize electric power consumption required for driving the heater. As a result, the general deodorization device may cause a large amount of electric power consumption, and make temperature of the exhaust gas exhausted into the indoor reach at 150-380° C.

Therefore, in the case of the conventional deodorization device of the indirect heating method or direct heating method having the above-described honey comb support structure, temperature of the exhaust gas exhausted into the indoor after having reacted with a catalyst is high if gas introduced into a deodorization chamber is heated at high temperature, for example, at 300-450° C. which is a catalyst activation temperature. Accordingly, the conventional deodorization device essentially requires that the temperature of the exhaust gas exhausted into the indoor should be lowered at temperature not more than 50° C.

As a result, according to the conventional art, an additional heat exchanger including a suction fan motor, an outdoor air inhalation unit, a condenser, etc., is installed in order to lower temperature of the indoor exhaust gas. However, since the electric power consumption of the heater is not reduced, electric power consumption of the suction fan motor for inhaling the outdoor air is not reduced.

Meanwhile, the conventional deodorization device has a structure that the catalyst support of the honey comb structure is formed of a metal thin plate, and is assembled in a manner of a brazing etc., in the inside of a housing which forms a deodorization chamber after being assembled with the heater. Therefore, the conventional deodorization device has a structure that it is hard to replace or recycle a catalyst support according to need.

In addition, hazardous substances such as carbon monoxide (CO) and nitrogen oxide (NOx) are included in the exhaust gas exhausted from vehicles, and thus a support converter for purifying exhaust gas is provided at the rear end of a vehicle exhaust manifold in order to remove hazardous substances from the exhaust gas by a perfect combustion method and discharge the purified exhaust gas.

Since temperature of exhaust gas may not reach temperature sufficient for performing a catalytic reaction in a support converter, at the initial time when a vehicles engine starts, an additional separate heater should be provided, or a support converter should be located near the engine in order to heat the catalyst support at the catalyst activation temperature quickly. Otherwise, the conventional deodorization device may use various methods of employing a catalyst converter such as a Close Coupled Catalytic Converter (CCC) where two or more supports are made close to one another.

DISCLOSURE

Technical Problem

To solve the above problems, it is an object of the present invention to provide a monolith called a catalyst support, a catalyst converter for purifying exhaust gas using the monolith, and a method of manufacturing the same, which heats all portions of a support at a catalyst activation temperature evenly, to thereby improve a deodorization or purification performance for exhaust gas through an effective oxidation or reduction reaction with a catalyst that has been coated on the surface of the support.

It is another object of the present invention to provide a catalyst converter for purifying exhaust gas in which a heater is installed in a monolith called a catalyst support in a burial style, to thereby maximize a contact area between the heater and the catalyst support, and simultaneously heat the entire portions of the monolith uniformly at a catalyst activation temperature, to thus enhance a heat transfer efficiency and heighten a catalytic reaction efficiency, and accordingly lower electric power consumption of a suction motor for inhaling outdoor air in order to lower an exhaust gas temperature.

It is still another object of the present invention to provide a catalyst converter for purifying exhaust gas in which a heater is installed in a monolith called a catalyst support in a burial style, to thereby minimize length of an exhaust gas purifier.

It is yet another object of the present invention to provide a catalyst converter for purifying exhaust gas in which a heater is installed in a monolith called a catalyst support in a burial style, to thereby enhance a heat transfer efficiency so that a low capacity heater can be used.

It is yet still another object of the present invention to provide a catalyst converter for purifying exhaust gas, which employs a hybrid style heater that adopts a direct heating method and an indirect heating method in a hybrid style when exhaust gas including an offensive odor passes through a number of hollow cells on which a catalyst has been coated, to thus heat all portions of the cells uniformly at a catalyst activation temperature, and to thereby heighten a deodorization reaction efficiency through an effective reaction with the catalyst.

It is a further object of the present invention to provide a catalyst converter for purifying exhaust gas, which employs a hybrid style heater in which size and arrangement of a winding portion of the heater are appropriately established to then be arranged in the inside of a housing, to thereby implement a path of a flow so that heat generated from the heater is thermally effectively transferred to exhaust gas, and to thus heighten a deodorization and purification efficiency and optimize electric power consumption.

It is a still further object of the present invention to provide a catalyst converter for purifying exhaust gas, in which a monolith called a catalyst support can be separably assembled in a housing.

It is a yet further object of the present invention to provide a catalyst converter for purifying exhaust gas, which includes a distributer which disperses exhaust gas evenly into respective cells of a monolith called a catalyst support which are located at the rear end of the catalyst converter.

It is a yet still further object of the present invention to provide a monolith called a catalyst support and a catalyst converter for purifying exhaust gas, which includes communication holes which communicate between hollow cells, respectively, and which enlarges a contact area and a reaction time with a catalyst when exhaust gas passes through the hollow cells of the monolith.

Technical Solution

To accomplish the above object of the present invention, according to an aspect of the present invention, there is provided a catalyst converter for purifying exhaust gas, the catalyst converter comprising: a heater having a winding portion which is wound so as to have a space therein and a pair of electric power terminals which are extended in a straight line form to both sides from the winding portion; an inner monolith called a catalyst support which is inserted in the inner circumferential portion of the heater winding portion wherein the inner monolith comprises a number of hollow cells on the surfaces of which a catalyst has been coated and which are formed in the lengthy direction; an outer monolith called a catalyst support which is inserted in the outer circumferential portion of the heater winding portion wherein the outer monolith comprises a number of hollow cells on the surfaces of which a catalyst has been coated and which are formed in the lengthy direction; and a housing which comprises an inlet through which exhaust gas to be processed is introduced and an outlet through which the processed exhaust gas is exhausted near both side ends thereof, wherein a support assembly where the inner monolith and the outer monolith are assembled in the inside/outside of the heater winding portion is assembled in the housing.

Preferably but not necessarily, the cross-section of the winding portion of the heater is formed of any one form among a cylinder, a square pillar, and a triangular prism.

Preferably but not necessarily, a number of the hollow cells in the inner and outer monoliths are formed of a horny comb form.

Preferably but not necessarily, when the catalyst converter is applied to a food trash processor, the former is installed in the latter in a perpendicular direction, and the support assembly is detachably assembled in the inside of the housing, and comprises an annular protrusion or a number of small size protrusions in the inner circumferential portion of the housing in order to hinder the support assembly from moving by gravity.

Preferably but not necessarily, the housing is installed in a perpendicular direction, and the inlet if disposed at the lower side thereof.

Preferably but not necessarily, the inner and outer catalyst support comprise a number of communication holes which communicate with the respectively adjoined hollow cells, and further comprises a protruding portion that is protruded toward the inner portions of the cells from the communication holes.

Preferably but not necessarily, the catalyst converter further comprises a distributer which is arranged at the entrance side of the housing through which exhaust gas is introduced, and disperses the exhaust gas introduced into the inside of the housing, to then be supplied evenly to the whole catalyst support that is located at the rear end thereof.

Preferably but not necessarily, the distributer comprises a number of hollow cells of a honey comb shape and a downstream electric power terminal of the heater is penetratively combined at the center of the distributer.

According to another aspect of the present invention, there is also provided a method of manufacturing a catalyst converter for purifying exhaust gas, the catalyst converter manufacturing method comprising the steps of: preparing a heater having a winding portion which is wound so as to have a space therein and a pair of electric power terminals which are extended in a straight line form to both sides from the winding portion; inserting an inner monolith called a catalyst support having a number of hollow cells on the surfaces of which a catalyst has been coated into the inner portion of the heater winding portion; combining an outer monolith called a catalyst support having a number of hollow cells on the surfaces of which a catalyst has been coated with the outer circumferential portion of the heater winding portion; and assembling a support assembly where the inner monolith and the outer monolith are assembled in the inside/outside of the heater winding portion, into a housing which comprises an inlet through which exhaust gas to be processed is introduced and an outlet through which the processed exhaust gas is exhausted near both side ends thereof.

Preferably but not necessarily, the support assembly is fixed in the housing in a brazing or diffused junction form.

Preferably but not necessarily, the catalyst converter manufacturing method further comprises the step of forming an annular protrusion or a number of small size protrusions in the inner circumferential portion of the housing in order to hinder the support assembly from moving downwards by gravity, in which the catalyst assembly is detachably combined with the inside of the housing.

Preferably but not necessarily, the catalyst converter manufacturing method further comprises the step of combining upper and lower caps with the upper and lower ends of the housing, respectively in order to seal the inside of the housing when the pair of the electric power terminals are withdrawn via a central throughhole to the outside.

According to still another aspect of the present invention, there is also provided a catalyst converter for purifying exhaust gas, the catalyst converter comprising: a housing having an inlet through which exhaust gas to be processed is introduced and an outlet through which the processed exhaust gas is exhausted near both side ends thereof; a heater having a winding portion which is disposed near the inlet of the housing and is wound so as to have a space therein and first and second straight line portions which are extended in a straight line form from the winding portion to the outside of the housing; a monolith called a catalyst support which is disposed at the rear end of the heater, and at the central portion of which the first straight line portion of the heater is penetratively combined, wherein a number of hollow cells on the surfaces of which a catalyst has been coated are formed in the lengthy direction, to thereby purify exhaust gas; and a distributer which is arranged between the winding portion of the heater and the catalyst support and disperses the exhaust gas introduced into the inside of the housing, to then be supplied evenly to the whole catalyst support that is located at the rear end thereof.

Preferably but not necessarily, the distributer comprises a number of hollow cells of a honey comb shape and wherein the second straight line portion of the heater is penetratively combined at the center of the distributer.

According to yet another aspect of the present invention, there is also provided a catalyst converter for purifying exhaust gas, the catalyst converter comprising: a housing having an inlet through which exhaust gas to be processed is introduced and an outlet through which the processed exhaust gas is exhausted where the inlet and the outlet are connected with an entrance and an exit near both side ends thereof, respectively, and a lower cap and an upper cap which seal both side ends thereof at both the side ends thereof, and a path of a flow through which exhaust gas to be processed passes therein; a heater having a winding portion which is disposed at the entrance of the flow path, and which has a predetermined diameter in order to heat exhaust gas to be processed, and first and second straight line portions which are extended in a straight line form along the axial direction from the central portion of the winding portion, wherein the first straight line portion is extended to the outside of the lower cap of the housing and the second straight line portion is extended to the outside of the upper cap of the housing; and a monolith called a catalyst support which is disposed at a distance from the rear end of the heater, and at the central portion of which the straight line portions of the heater are inserted and fixed, to thus perform a heat transfer operation of the heater, wherein a number of hollow cells on the surfaces of which a catalyst has been coated are formed at the outer circumferential portion of the monolith in the lengthy direction, to thereby purify exhaust gas to be processed.

Preferably but not necessarily, the heater is formed of a sheath heater where electric power terminals are respectively formed at one end and the other end which are extended to the outside of the lower cap and the upper cap of the housing.

Preferably but not necessarily, the heater is formed of a cartridge heater where a pair of electric power terminals are arranged at one end that is extended to the outside of the lower cap of the housing.

Preferably but not necessarily, the inner diameter of the winding portion of the heater is established to equal that of the entrance or to be smaller than 40% of the inner diameter of the entrance, and the outer diameter of the winding portion is established to be smaller than the inner diameter of the housing, but larger than half (½) of the inner diameter of the housing.

Preferably but not necessarily, the winding portion of the heater is disposed at a distance from the entrance of the housing and the catalyst support is disposed at a distance from the exit of the housing.

Preferably but not necessarily, the housing is installed in a perpendicular direction and the entrance of the housing is arranged at the lower side thereof.

According to yet still another aspect of the present invention, there is also provided a catalyst converter for purifying exhaust gas, the catalyst converter comprising: a housing having an entrance and an exit at both side ends thereof, respectively, and a path of a flow through which exhaust gas to be processed passes therein; a heater having a winding portion which is disposed at the entrance of the flow path, and which has a predetermined diameter in order to heat exhaust gas to be processed and introduced into the flow path, and a straight line portion which is extended in a straight line form along the axial direction from the central portion of the winding portion; and a monolith called a catalyst support which is disposed at a distance from the rear end of the heater, and at the central portion of which the straight line portion of the heater is inserted and fixed, to thus perform a heat transfer operation of the heater, wherein a number of hollow cells on the surfaces of which a catalyst has been coated are formed at the outer circumferential portion of the monolith in the lengthy direction, to thereby purify exhaust gas to be processed and to pass through the respective cells.

Preferably but not necessarily, the monolith called a catalyst support is a laminated body obtained by laminating a corrugated wave plate on a flat plate, and then winding the laminated plates in a spiral form, and wherein the flat plate and the wave plate are obtained by coating catalyst metal on a FeCrAl group alloy thin plate.

Preferably but not necessarily, the flat plate and the wave plate are 20-100 μm thick, respectively.

According to a further aspect of the present invention, there is also provided a catalyst converter for purifying exhaust gas, the catalyst converter comprising: a housing having an inlet through which exhaust gas to be processed is introduced and an outlet through which the processed exhaust gas is exhausted near both side ends thereof, respectively; and a monolith called a catalyst support which comprises a number of hollow cells which are disposed in the inside of the housing and on the surfaces of which a catalyst has been coated are formed in the lengthy direction, to thereby purify exhaust gas to be processed, wherein the catalyst support is a laminated body obtained by laminating a corrugated wave plate on a flat plate, and then winding the laminated plates in a spiral form, and wherein electric power is applied to the corrugated wave plate.

According to a still further aspect of the present invention, there is also provided a monolith called a catalyst support for use in a catalyst converter for purifying exhaust gas to be processed and exhausting the purified exhaust gas, the monolith comprising: a flat plate which is wound in a spiral form; a wave plate which is formed of a corrugated shape and is laminated and molten on one side surface of the spirally wound flat plate along the spirally wound flat plate, to thus form a number of hollow cells together with the flat plate in the lengthy direction of housing; and a catalytic layer on which a catalyst has been coated and which is formed on the surfaces of the flat and wave plates, to thus perform an oxidation and reduction of the exhaust gas, wherein a number of communication holes which communicate with the respectively adjoined hollow cells are formed on the flat and wave plates, respectively.

Preferably but not necessarily, a number of the hollow cells of the monolith is formed of a horny comb form, in the monolith.

Preferably but not necessarily, the monolith further comprises a protruding portion that is protruded toward the inside of the cells from the communication holes.

Advantageous Effects

As stated above, the catalyst converter for purifying exhaust gas according to this invention enables a heater and a catalyst support to contact directly each other over a large area, to thus enhance a heating efficiency for a monolith called a catalyst support. As a result, electric energy consumption is reduced for heating introduced exhaust gas and the monolith called catalyst support.

In addition, the monolith called a catalyst support is heated at a high efficiency at proper temperature, to thus process exhaust gas. Accordingly, temperature of the catalytically processed exhaust gas is not high either. Accordingly, drive of a suction motor for introducing outdoor air is minimized in order to lower temperature of the exhaust gas exhausted the indoor, and to reduce electric power consumption.

In addition, since the heater and the monolith are integrally formed, length of the catalyst converter for purifying exhaust gas is minimized.

Moreover, this invention employs a hybrid style heater that mixes a direct heating method and an indirect heating method, to thus heat the whole area of a monolith called a catalyst support uniformly at a catalyst activation temperature, and to thereby heighten a deodorization reaction efficiency through an effective reaction with a catalyst when exhaust gas including an offensive odor passes through a number of hollow cells on which the catalyst has been coated. In this case, size of the heater is properly established and then is disposed in the inside of the housing, to thus implement a path of a flow which can thermally transfer heat produced from the heater to exhaust gas effectively. As a result, a deodorization and purification efficiency may be heightened and electric power consumption may be minimized.

DESCRIPTION OF DRAWINGS

The above and other objects and advantages of the present invention will become more apparent by describing the preferred embodiments thereof in detail with reference to the accompanying drawings in which.

BEST MODE

Figure 1:
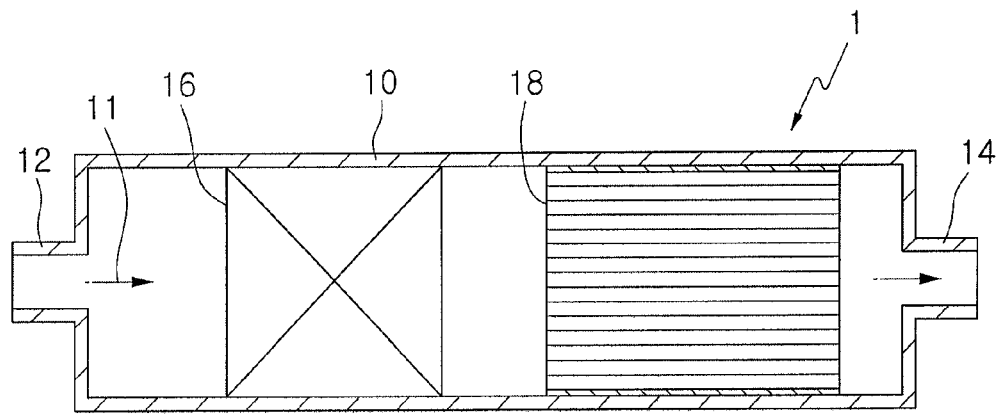
FIG. 1 is a schematic cross-sectional view showing a conventional deodorization device for processing food trashes.

Hereinbelow, a catalyst support called a monolith, a catalyst support converter called a catalyst converter for purifying exhaust gas using the same, and a method for manufacturing the catalyst converter, according to various embodiments of the present invention will be described with reference to the accompanying drawings. Like reference numerals denote like elements through the following embodiments. However, the detailed description of the relevant known functions or structures will be omitted when operational principles of the preferred embodiments of the present invention are described.

First, a catalyst converter for purifying exhaust gas according to respective embodiments of the present invention which is used for a deodorization device for removing an offensive odor of exhaust gas in a food trash processing device, will be described below. However, the catalyst converter for purifying exhaust gas according to this invention can be used usefully to purify exhaust gas including hazardous gas that is produced at the time of fuel combustion of vehicles.

Figure 2:
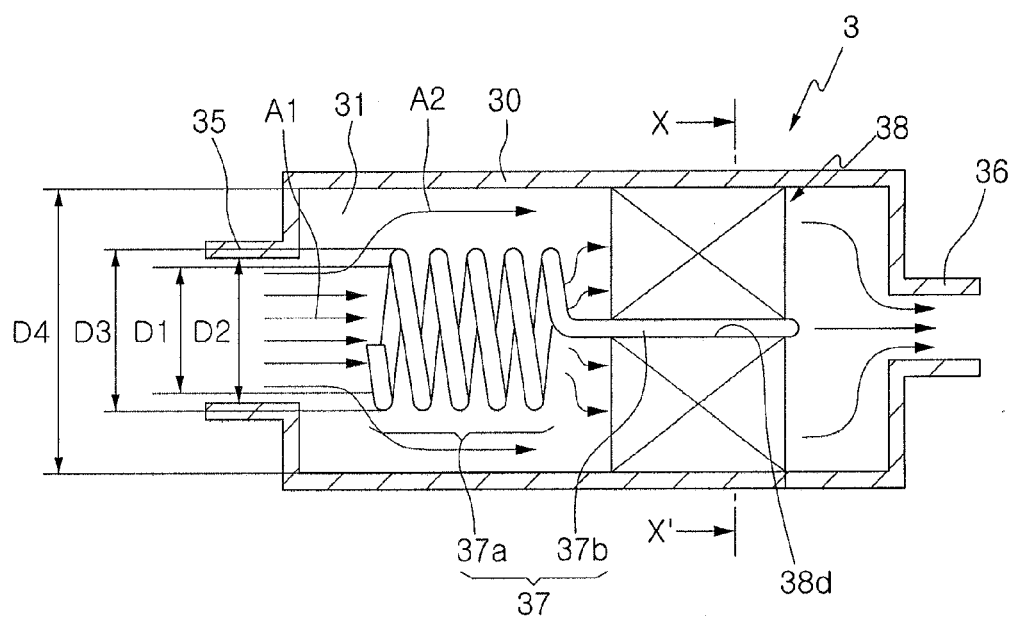
FIG. 2 is a schematic diagram showing the internal structure of a catalyst converter for purifying exhaust gas according to a first embodiment of this invention.
Figure 3A:
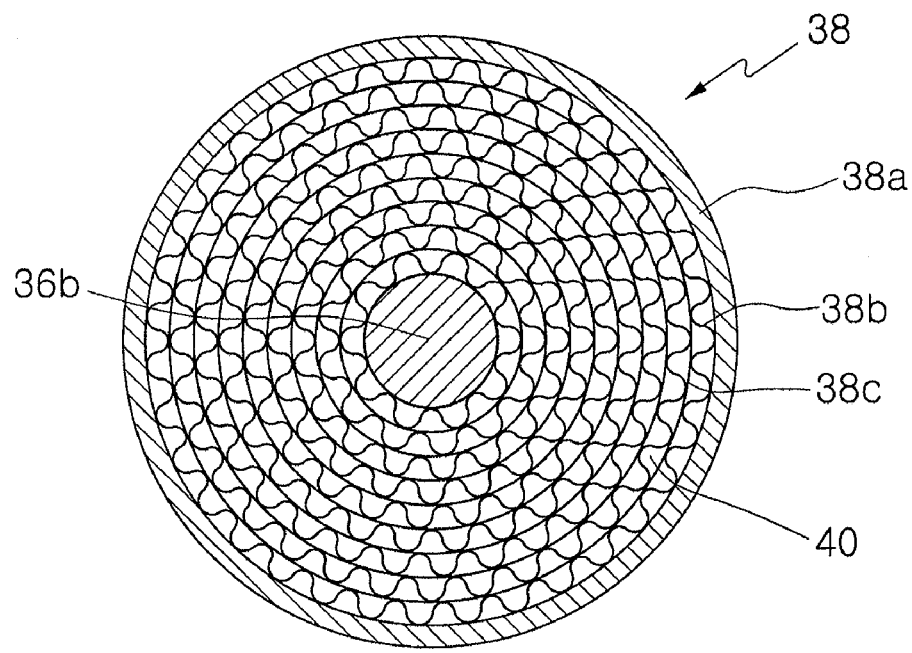
FIGS. 3A and 3B are cross-sectional views cut along a line X-X' of FIG. 2, respectively.
Figure 3B:
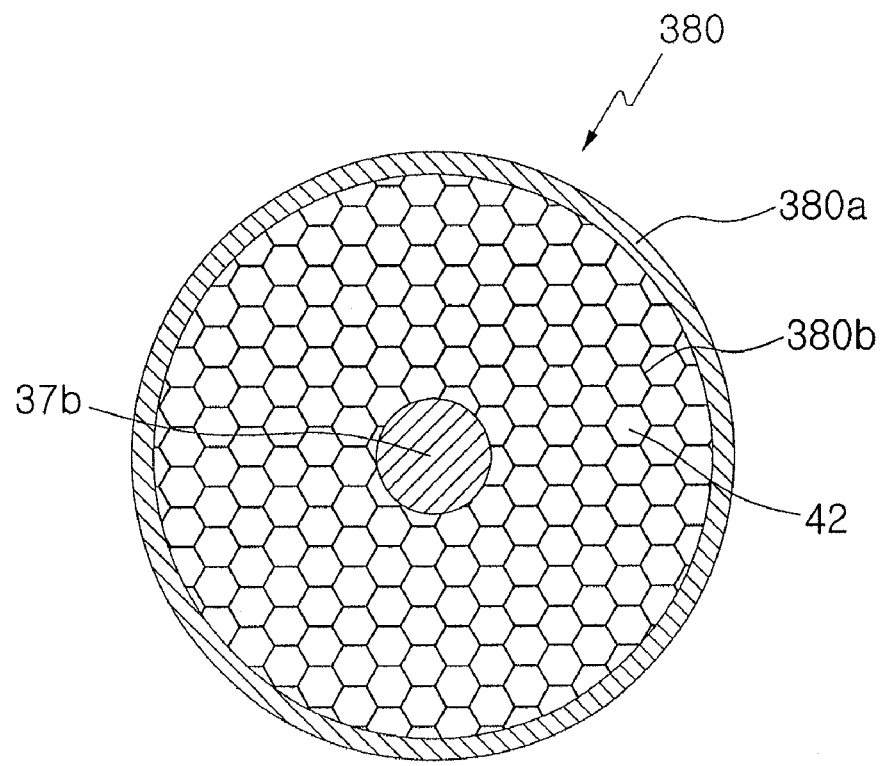

FIG. 2 is a schematic diagram showing the internal structure of a catalyst converter for purifying exhaust gas according to a first embodiment of this invention. FIGS. 3A and 3B are cross-sectional views cut along a line X-X' of FIG. 2, respectively.

First, as illustrated in FIG. 2, a catalyst converter 3 for purifying exhaust gas according to an embodiment of this invention includes: a housing 30 having an entrance 35 and an exit 36 in both sides thereof, and a deodorization chamber (or a path of a flow) 31 through which exhaust gas including an offensive odor passes; a heater 37 having a winding portion 37a which is disposed at the entrance of the deodorization chamber 31 and which is wound to have a predetermined diameter in order to heat exhaust gas introduced into the deodorization chamber 31, and a straight line portion 37b which is extended in a straight line form along the axial direction from the center of the winding portion 37a, in which the winding portion 37a and the straight line portion 37b are integrally formed; and a monolith 38 called a catalyst support having a honey comb structure which is disposed at the rear end of the heater 37, and at the central portion of which the straight line portion 37b of the heater 37 is inserted, wherein a number of hollow cells 40 and 42 on the surfaces of which a catalyst has been coated are formed at the outer circumferential portion of the monolith 38 in the lengthy direction, to thereby purify exhaust gas to be processed.

In general, the catalyst converter is designed so that exhaust gas may pass through and flow in the catalyst converter by a blower or the other air suction/discharge unit which is installed in an exhaust line which are connected with the entrance 35 or exit 36.

For example, the heater 37 may be manufactured using a sheath heater as a heating element that is manufactured by putting electric wires into a metal tube, and sealing the metal tube with magnesium powder or aluminum oxide powder. In addition, the heater 37 may be manufactured using other heating elements having the similar functions to that of the sheath heater.

In this case, the inner diameter D1 of the winding portion 37a of the heater 37 is established to equal the inner diameter D2 of the entrance 35 or to be smaller than 40% of the inner diameter D2 of the entrance 35, and the outer diameter D3 of the winding portion 37a is established to be smaller than the inner diameter D4 of the housing 30, but larger than half (½) of the inner diameter D4 of the housing 30.

That is, only if the inner diameter D1 of the winding portion 37a of the heater 37 is smaller than that D2 of the entrance 35, a stream of the exhaust gas that is introduced into the entrance 35 of the housing 30 is divided into a flow A1 passing through the inside of the winding portion 37a and a flow A2 passing through the outside of the winding portion 37a, as shown in arrow marks. In addition, when the inner diameter D1 of the winding portion 37a of the heater 37 is established to be smaller than 40% of the inner diameter D2 of the entrance 35, calorie that is generated from the winding portion 37a becomes small. In this case, optimization of electric power consumption that is needed to heat the monolith, that is, the catalyst support at a catalyst activation temperature may not be accomplished.

In addition, only if the outer diameter D3 of the winding portion 37a of the heater 37 is established to be smaller than the inner diameter D4 of the housing 30, exhaust gas can be divided by the winding portion 37a. Only if the outer diameter D3 of the winding portion 37a of the heater 37 is established to be larger by half (½) than the inner diameter D4 of the housing 30, optimization of electric power consumption that is needed to heat the monolith, that is, the catalyst support at a catalyst activation temperature may be accomplished.

As described above, the reason why size of the winding portion 37a of the heater 37 is established is to effectively use heat generated from the winding portion 37a in order to heat the exhaust gas and the monolith 38 since the heat generated from the winding portion 37a when electric power is supplied to the heater 37 is diverged to the outer side of the winding portion 37a as well as the inner side of the winding portion 37a.

That is, if the outer diameter D3 of the winding portion 37a of the heater 37 is established to be smaller than the inner diameter D4 of the housing 30, a stream of the exhaust gas that is introduced into the entrance 35 of the housing 30 is divided into a flow A1 passing through the inside of the winding portion 37a and a flow A2 passing through the outside of the winding portion 37a, as shown in arrow marks. Accordingly, an effective heat transfer is attained with the heat emitted to the inner and outer sides of the winding portion 37a, respectively.

Moreover, the winding portion 37a of the heater 37 is preferably disposed at a distance from the entrance 35 of the housing 30 and the catalyst support 38, respectively, and the catalyst support 38 is preferably disposed at a predetermined distance from the exit 36 of the housing 30.

Such distances between the winding portion 37a and either of the housing 30 or the catalyst support 38, and between the catalyst support 38 and the exit 36 of the housing 30 are to utilize the winding portion 37a of the heater 37 as an indirect heating method. In this case, exhaust gas which passes through the entrance 35 whose cross-section is narrow in the housing 30 and is introduced into the deodorization chamber 31 whose cross-section is wide in the housing 30. Accordingly, flow of the exhaust gas is naturally divided by the winding portion 37a. Then, the exhaust gas passes through the inside of the winding portion 37a, and the heat exchanged high-temperature exhaust gas is dispersed again. Accordingly, the exhaust gas is induced to flow in the neighborhood of the monolith 38 and thus is heated uniformly in advance before the exhaust gas reaches the monolith 38. In addition, the exhaust gas having passed through the neighborhood of the monolith 38 stays at the exit side and is mixed with the relatively high-temperature exhaust gas having passed through the central portion, to thereby play a role of raising temperature of the exit side.

Meanwhile, as illustrated in FIG. 3A, the monolith or the catalyst support 38 is formed of a material which is obtained by coating catalytic metal such as white gold, cobalt, nickel, palladium, rhodium or nano silver on a FeCrAl group heat resistant alloy thin plate having a thickness of 20-100 μm. A fusion welding is achieved in each and every contact where a corrugated wave plate 38b contacts the flat plate 38c. Then, the laminated plates are wound and the wound plates are contained in a cylindrical case 38a, so as to have a honey comb structure.

The catalyst support 38 is established into a catalyst activation temperature of 200-600° C., for example, according to the kind of catalyst metal.

In this case, the catalyst support 38 includes a number of cells 40 which are formed in the lengthy direction by the flat plate 38c and the wave plate 38b. A throughhole 38d through which a straight line portion 37b which is extended in a straight line form from the winding portion 37a of the heater 37 is formed at the central portion of the catalyst support 38. Cells 40 formed in the catalyst support 38 may be formed of a semi-circular shape or triangle according to shape of the wave plate 38b.

It is desirable to use a Fecalloy alloy which is synthesized at a ratio of Fe-15Cr-5Al, or Fe-20Cr-5Al-REM (rare earth metal) (including 1% of REM (Y, Hf, Zr)) as the FeCrAl group alloy material.

In addition, as illustrated in FIG. 3B, the monolith or catalyst support 380 includes a number of hollow cells 42 made of ceramics and structure of a rectangular, hexagonal or circular shape, as another honey comb structure. The catalyst support 380b on the surface of which a catalyst layer has been coated is incorporated in a cylindrical case 380a. A throughhole through which a straight line portion 37b is inserted is formed at the central portion of the monolith or catalyst support 380.

Moreover, the catalyst support 380 of the honey comb shape may be manufactured using metal as shown in the embodiment of FIG. 3A.

In the case of the catalyst converter 3 having the above-described structure according to the first embodiment of the present invention, if exhaust gas including an offensive odor that is generated from a food trash processing device is introduced into the entrance 35 of the catalyst converter 3 through an exhaust passage (a pipe or duct), a part of the exhaust gas is divided into a flow A1 passing through the inside of the winding portion 37a and a flow A2 passing through the outside of the winding portion 37a, in the inside of the deodorization chamber 31. Accordingly, an effective heat transfer (an effective heat exchange) is attained with the heat emitted to the inner and outer sides of the winding portion 37a, respectively, while passing through a number of hollow cells 40 and 42 of the catalyst support 38.

The central portion of the catalyst support 38 is heated by the straight line portion 37b of the heater 37, and the exhaust gas which has been heated by the winding portion 37a passes through the peripheral portion of the catalyst support 38. Accordingly, the whole catalyst support 38 is heated uniformly at a catalyst activation temperature. In this case, the exhaust gas which has passed through the winding portion 37a which has been heated by the indirect heating method by the winding portion 37a of the heater 37 and heat-exchanged is dispersed in the catalyst support 38. Accordingly, the heat transfer is quickly performed up to the rear end of the catalyst support 38 by the direct heating method by the straight line portion 37b of the heater 37, as well as the peripheral portion of the catalyst support 38. As a result, minimized electric power consumption occurs in comparison with the case of using the indirect heating method or the direct heating method alone. Therefore, the whole catalyst support 38 is effectively heated.

Therefore, the catalyst support 38 according to the embodiment of this invention maintains the catalyst activation temperature without having big temperature differences between the central portion and the peripheral portion and between the front end portion and the rear end portion. As a result, the exhaust gas that passes through a number of hollow cells 40 and 42 of the catalyst support 38 makes an oxidation reaction with an oxidation catalyst such as white gold, cobalt, nickel and palladium which has been coated on the surfaces of the cells, to thus decompose offensive odor particles that are included in the exhaust gas to remove an offensive odor, or to thus oxidize monoxide and hydrocarbon which are the exhaust gases for vehicles, to purify harmful gas into non-harmful gas.

In this case, nitrogen oxide (NOx) is decomposed into nitrogen ($N_2$) and oxygen ($O_2$) through a reduction reaction using a reduction catalyst such as rhodium (Rh), to thus exhaust the exhaust gas that has been decomposed into the nitrogen ($N_2$) and oxygen ($O_2$) through the exit 36.

<Experimental Test for Testing a Deodorization Performance>

In order to see a deodorization performance of a catalyst converter according to the embodiment of the present invention, the catalyst converter has been prepared in which platinum (Pt) is used as a catalyst and coated on the catalyst support of the honey comb structure as shown in FIGS. 2 and 3A, and a hybrid style heater of the indirect heating method and the direct heating method is employed. Then, an offensive odor has been measured using an offensive odor measuring unit such as OMX-SR manufactured by SHINYEI Co., Ltd., with food samples of 400 g. In the result of measurement, the offensive odor has been measured as a level of 0-2 or so. After the catalyst has been activated, the offensive odor has been measured as a level of "0," that is, the offensive odor has not been substantially detected from the exhaust gas.

A catalyst converter has been prepared as a comparison example 1 in which platinum (Pt) has been used as a catalyst and coated on the metal catalyst support of the honey comb structure as illustrated in FIG. 1, and an approximation heating sheath heater has been employed. Thereafter, an offensive odor has been measured under the same condition as that of the above-described embodiment of the present invention. As a result, the offensive odor has been measured as a level of 60-120, in the case of the comparison example 1.

In addition, a catalyst converter has been prepared as a comparison example 2 in which platinum (Pt) and palladium (Pd) have been used as catalysts and coated on a spiral metal plate, and a centrally inserted cartridge heater has been employed. Thereafter, an offensive odor has been measured under the same condition as that of the above-described embodiment of the present invention. As a result, the offensive odor has been measured as a level of 7-8, in the case of the comparison example 2.

In the above-described deodorization performance testing result, it can be seen that the catalyst converter according to the embodiment of the present invention is very excellent thing when compared with the comparison examples 1 and 2 according to the conventional art.

As described above, the catalyst converter according to the embodiment of the present invention employs the hybrid style heater 37 where the indirect heating method and the direct heating method have been mixed, and heats the whole area of the catalyst support 38 of the honey comb structure uniformly at the catalyst activation temperature. Accordingly, when the exhaust gas including an offensive odor passes through a number of hollow cells on which the catalyst has been coated, perfect deodorization is achieved through an effective reaction with the catalyst.

In addition, in the case of this invention, size of the winding portion 37a of the heater 37 is properly established, and the winding portion 37a is disposed in the inside of the housing 30, to accordingly implement a path of a flow which can accomplish an effective heat transfer of heat generated from the heater to the exhaust gas. As a result, a deodorization efficiency may be heightened and optimization of electric power consumption may be attained.

Figure 4:
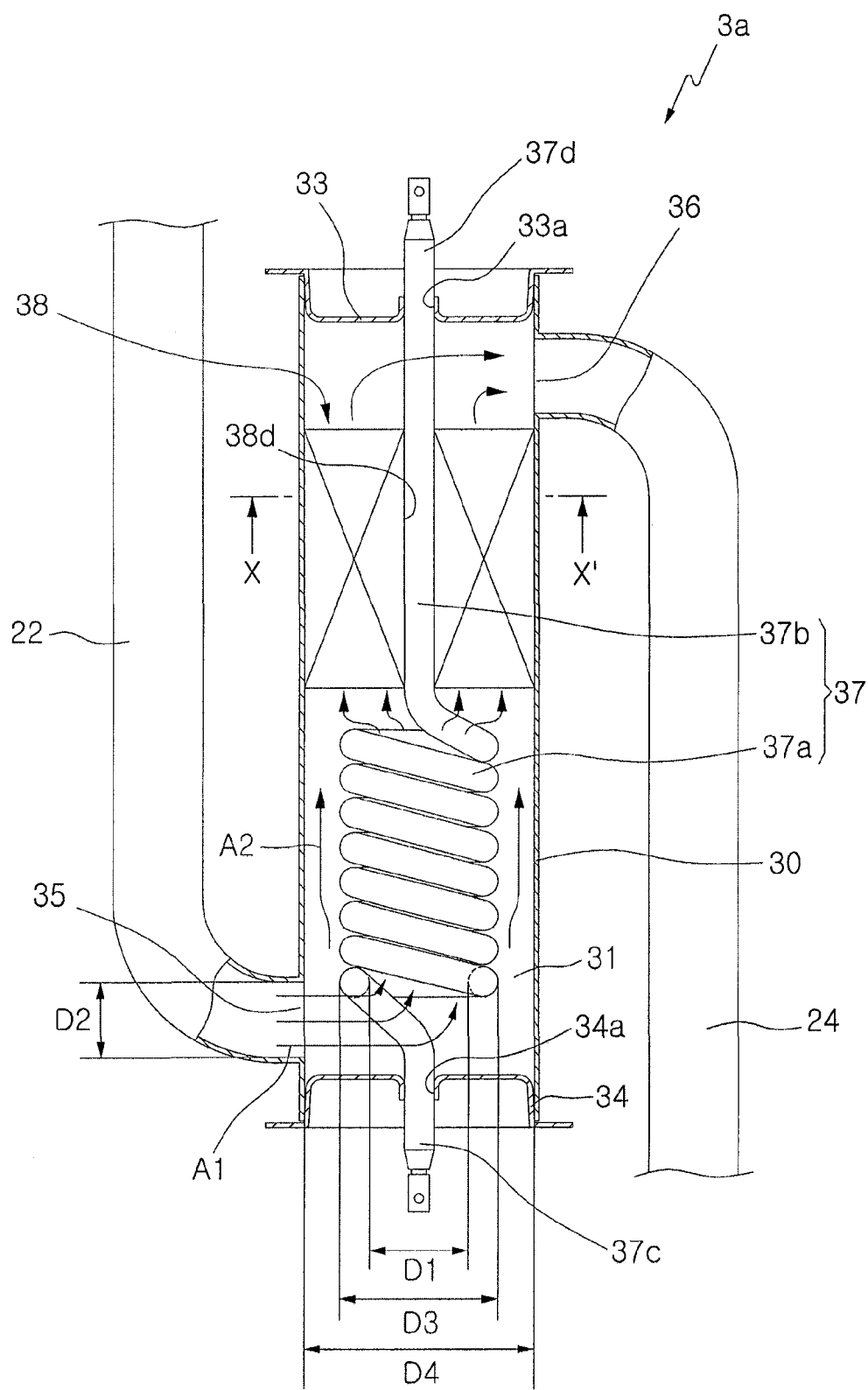
FIG. 4 is a schematic diagram showing the internal structure of a catalyst converter for purifying exhaust gas according to a second embodiment of this invention.
Figure 5:
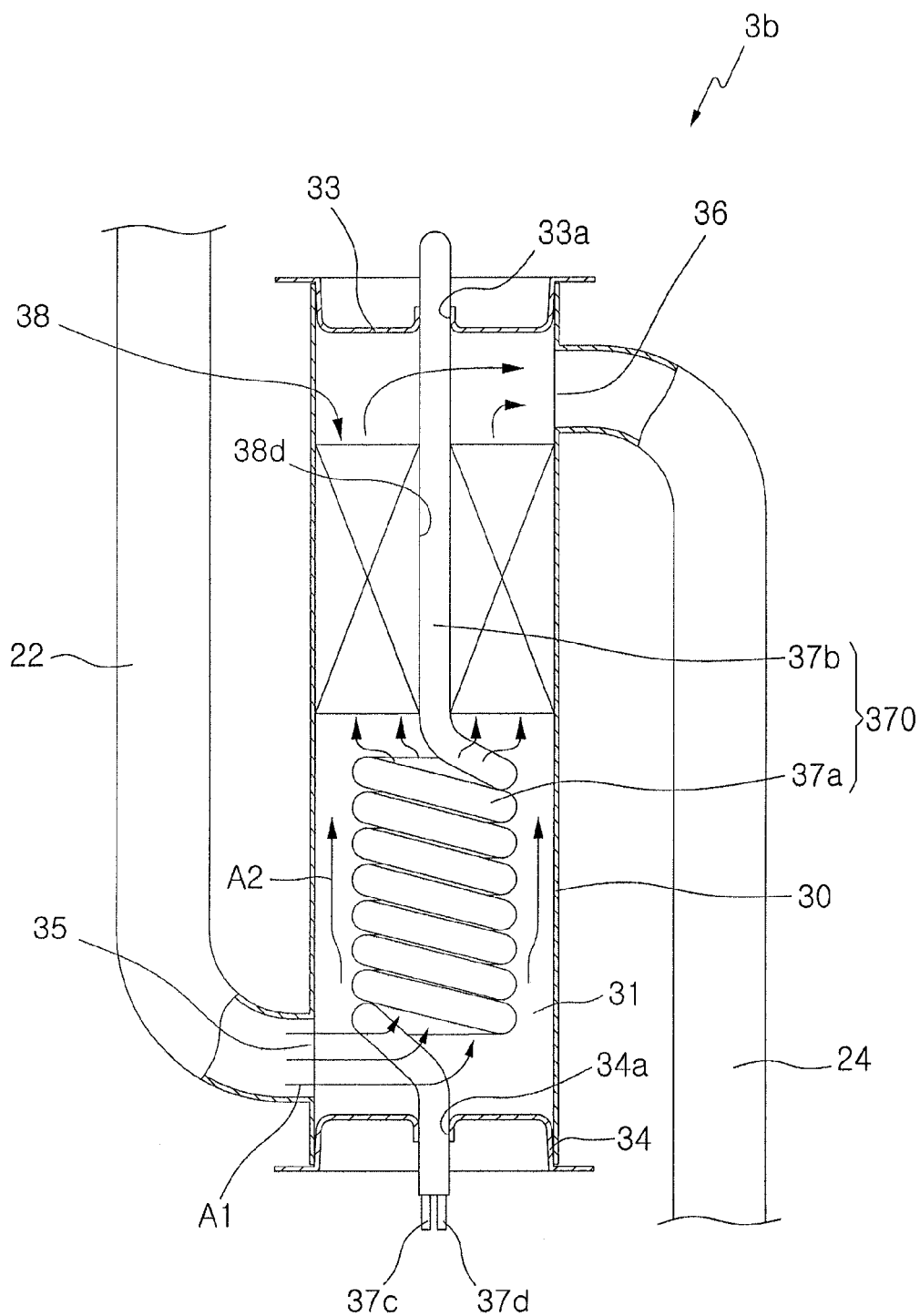
FIG. 5 is a schematic diagram showing the internal structure of a catalyst converter for purifying exhaust gas according to a third embodiment of this invention.

FIG. 4 is a schematic diagram showing the internal structure of a catalyst converter for purifying exhaust gas according to a second embodiment of this invention, and FIG. 5 is a schematic diagram showing the internal structure of a catalyst converter for purifying exhaust gas according to a third embodiment of this invention.

First, a catalyst converter 3a for purifying exhaust gas according to a second embodiment of the present invention is shown in FIG. 4. The catalyst converter 3a includes: a housing 30 having an inlet 22 through which exhaust gas including an offensive odor to be processed is introduced and an outlet 24 through which the processed offensive odor removed exhaust gas is exhausted where the inlet 22 and the outlet 24 are connected with an entrance 35 and an exit 36 near both side ends thereof, respectively, and a lower cap 34 and an upper cap 33 which seal both side ends thereof at both the side ends thereof, and a deodorization chamber 31 through which exhaust gas including an offensive odor to be processed passes therein; a heater 37 having a winding portion 37a which is disposed at the entrance of the deodorization chamber 31, and which has a predetermined diameter in order to heat exhaust gas which has been introduced into the deodorization chamber 31, and a straight line portion 37b which is extended in a straight line form along the axial direction from the central portion of the winding portion 37a, in which the winding portion 37a and the straight line portion 37b are integrally formed, and in which one side electric power terminal 37c through which electric power is applied is extended to the outside of the lower end of the housing 30 and the other side electric power terminal 37d is extended to the outside of the upper end of the housing 30; and a monolith 38 called a catalyst support having a honey comb structure which is disposed at the rear end of the heater 37, and at the central portion of which the straight line portion 37b of the heater 37 are inserted, wherein a number of hollow cells 40 and 42 on the surfaces of which a catalyst has been coated are formed at the outer circumferential portion of the monolith in the lengthy direction.

The housing 30 is formed of a cylindrical shape in which the heater 37 and the catalyst support 38 are built in at a predetermined positions in the inside of the housing 30, and includes an upper cap 33 which seals the upper end and a lower cap 34 which seals the lower end.

The upper cap 33 and lower cap 34 are formed of a circular plate whose central portion is inserted into the upper and lower ends of the housing 30, and which is protrudingly formed diametrically, respectively. Fixing holes 33a and 34a which respectively fix the heater 37 are formed at the very center of the upper cap 33 and lower cap 34, respectively. The upper cap 33 and the lower cap 34 are inserted into and installed in the upper and lower portions of the housing 30, respectively, to thus play a role of sealing the housing 30 and fixing both end portions of the heater 37.

Here, the catalyst converter 3a is installed in a perpendicular direction, for example, in the case of a food trash processing device. It is desirable that the entrance 35 is connected with the housing 30 located at the upper side of the lower cap 34, and the exit 36 is connected with the housing 30 located at the lower side of the upper cap 33, so that the catalyst support 38 is located at the upper side of the heater 37. The reason is to prevent the catalyst support 38 from being soaked due to a condensation phenomenon, and simultaneously make flow of the exhaust gas cause an eddy flow during the time when the exhaust gas is introduced into the inside of housing 30 and exhausted out of the housing 30, to thus lengthen a time when the exhaust gas stays in the heater 37 and the catalyst support 38 and to thereby achieve a perfect deodorization operation.

In general, the catalyst converter 3a for purifying exhaust gas is designed so that exhaust gas may pass through and flow in the catalyst converter 3a by a blower or the other air suction/discharge unit which is installed in an exhaust line which are connected with the entrance 35 or exit 36.

According to the second embodiment of this invention that is illustrated to FIG. 4, the heater 37 is implemented using a sheath heater whose one side electric power terminal 37c penetrates the lower cap 34 and is extended to the outside of the housing 30 and whose other side electric power terminal 37d penetrates the upper cap 33 and is extended to the outside of the housing 30.

Therefore, electric power for the heater 37 is applied between the one side electric power terminal 37c and the other side electric power terminal 37d.

The sheath heater has advantages that a temperature difference between the inner electric wires and the sheath may be sufficiently lowered, and the electric wires may not be deteriorated due to oxidation and may not be cut and eccentric due to impact, since the sheath heater is obtained by putting filaments at the center of various sheaths and putting high purity magnesium powder or aluminum oxide powder whose high temperature insulation degree is high and whose thermal conductivity is good between the filaments, and by compressing the outer diameter of the sheaths to then be integrated. In addition, the sheath heater illustrated in FIG. 2 has advantages that a manufacturing cost is inexpensive and a life of durability is excellent since both end portions of the filament are connected with the one side and the other side electric power terminals 37c and 37d, respectively.

Here, screw terminals are usually used as the electric power terminals of the heater 37, that is, the one side and the other side electric power terminals 37c and 37d. Besides, as shown in FIG. 4, a flat terminal or lug terminal may be used as the electric power terminals of the heater 37.

The heater 370 according to a third embodiment of this invention illustrated in FIG. 5 equals the second embodiment of this invention in view of structures of a winding portion 37a and a straight line portion 37b, but the former differs from the latter in a point of view that the heater 370 according to the third embodiment of this invention uses a cartridge heater of a flat terminal where a pair of electric power terminals 37c and 37d which are connected with the electric wires are disposed at one side thereof.

In the case of the heater 370 according to the third embodiment of the present invention, one end of the winding portion 37a penetrates the lower cap 34 and is extended to the outside of the housing 30, and one end of the straight line portion 37b penetrates the upper cap 33 and is extended to the outside of the housing 30.

In the case of the cartridge heater, the electric wires are wound on the surface of the high purity magnesium core at a precise interval by an automatic winding machine. The electric wires wound on the surface of the core are precisely filled with the high purity magnesium which is a high temperature electrical insulator at the very center of a metal tube, and then the metal tube is compressed by a high pressure compressor so that the cartridge heater can be integrally manufactured.

Therefore, the cartridge heater is advantageous in a point of view that the maximum calorie can be injected into the minimum area to thus supply heat necessary for the minimum space.

In the same manner as that of the first embodiment of the present invention, the inner diameter D1 of the winding portion 37a of the heater 37 or 370 which is used for the second and third embodiments of the present invention, respectively is established to equal the inner diameter D2 of the entrance 35 or to be smaller than 40% of the inner diameter D2 of the entrance 35, and the outer diameter D3 of the winding portion 37a is preferably established to be smaller than the inner diameter D4 of the housing 30, but larger than half (½) of the inner diameter D4 of the housing 30.

That is, only if the inner diameter D1 of the winding portion 37a of the heater 37 or 370 is smaller than that D2 of the entrance 35, a stream of the exhaust gas that is introduced into the entrance 35 of the housing 30 is divided into a flow A1 passing through the inside of the winding portion 37a and a flow A2 passing through the outside of the winding portion 37a, as shown in arrow marks. In addition, when the inner diameter D1 of the winding portion 37a of the heater 37 or 370 is established to be smaller than 40% of the inner diameter D2 of the entrance 35, calorie that is generated from the winding portion 37a becomes small. In this case, optimization of electric power consumption that is needed to heat the monolith, that is, the catalyst support at a catalyst activation temperature may not be accomplished.

In addition, only if the outer diameter D3 of the winding portion 37a is established to be smaller than the inner diameter D4 of the housing 30, exhaust gas can be divided by the winding portion 37a. Only if the outer diameter D3 of the winding portion 37a is established to be larger by half (½) than the inner diameter D4 of the housing 30, optimization of electric power consumption that is needed to heat the monolith, that is, the catalyst support at a catalyst activation temperature may be accomplished.

As described above, the reason why size of the winding portion 37a of the heater 37 or 370 is established is to effectively use heat generated from the winding portion 37a in order to heat the exhaust gas and the monolith 38 since the heat generated from the winding portion 37a when electric power is supplied to the heater 37 is diverged to the outer side of the winding portion 37a as well as the inner side of the winding portion 37a.

That is, if the outer diameter D3 of the winding portion 37a is established to be smaller than the inner diameter D4 of the housing 30, a stream of the exhaust gas that is introduced into the entrance 35 of the housing 30 is divided into a flow A1 passing through the inside of the winding portion 37a and a flow A2 passing through the outside of the winding portion 37a, as shown in arrow marks. Accordingly, an effective heat transfer is attained with the heat emitted to the inner and outer sides of the winding portion 37a, respectively.

Moreover, the winding portion 37a of the heater 37 or 370 is preferably disposed at a distance from the entrance 35 of the housing 30 and the catalyst support 38, respectively, and the catalyst support 38 is preferably disposed at a predetermined distance from the exit 36 of the housing 30.

Such distances between the winding portion 37a and either of the housing 30 or the catalyst support 38, and between the catalyst support 38 and the exit 36 of the housing 30 are to utilize the winding portion 37a of the heater 37 or 370 as an indirect heating method. In this case, exhaust gas which passes through the entrance 35 whose cross-section is narrow in the housing 30 and is introduced into the deodorization chamber 31 whose cross-section is wide in the housing 30. Accordingly, flow of the exhaust gas is naturally divided by the winding portion 37a. Then, the exhaust gas passes through the inside of the winding portion 37a, and the heat exchanged high-temperature exhaust gas is dispersed again. Accordingly, the exhaust gas is induced to flow in the neighborhood of the monolith 38 and thus is heated uniformly in advance before the exhaust gas reaches the monolith 38. In addition, the exhaust gas having passed through the neighborhood of the monolith 38 stays at the exit side and is mixed with the relatively high-temperature exhaust gas having passed through the central portion, to thereby play a role of raising temperature of the exit side.

The catalyst support 38 used in the second and third embodiments of the present invention 2 has a structure illustrated in FIGS. 3A and 3B, in the same as that of the first embodiment. Therefore, the detailed description thereof will be omitted.

Figure 6:
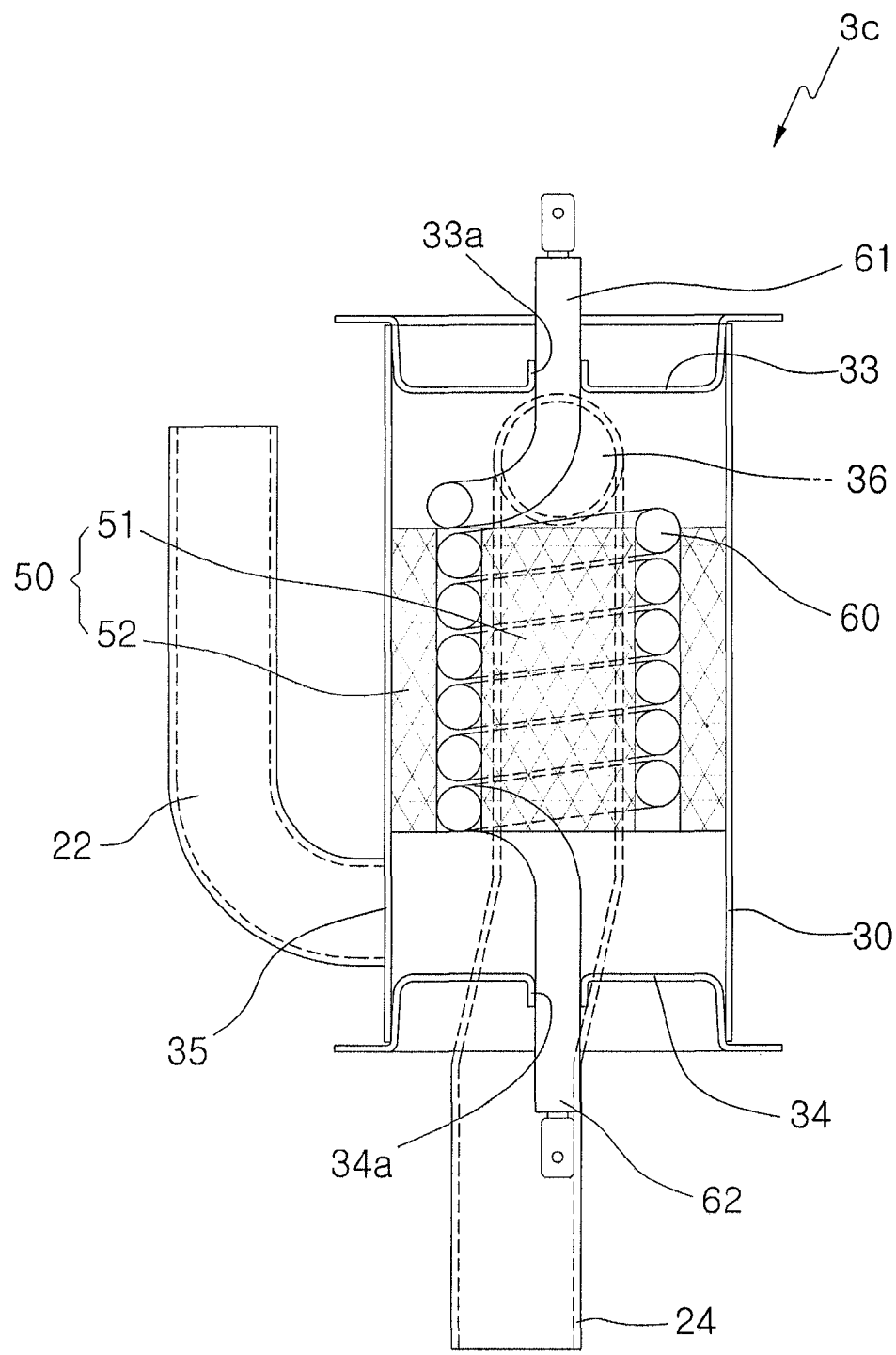
FIG. 6 is a cross-sectional view showing structure of a catalyst converter for purifying exhaust gas according to a fourth embodiment of this invention.
Figure 7A:
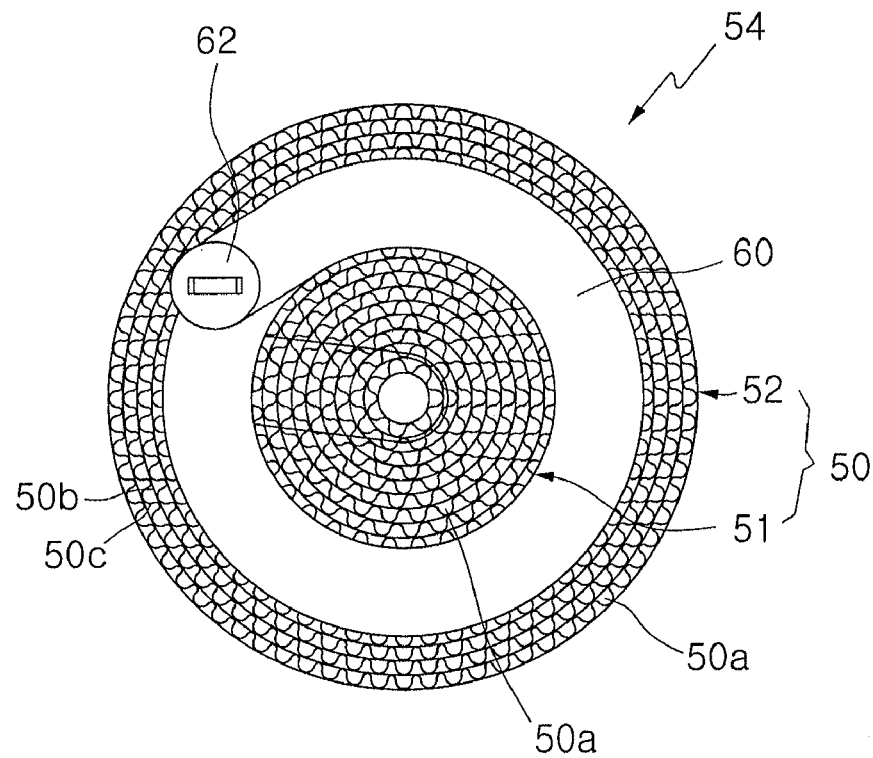
FIGS. 7A through 7C are a side view, a front view and a perspective view showing a heater is combined with a monolith called a catalyst support for use in a catalyst converter for purifying exhaust gas according to the fourth embodiment of this invention, respectively.
Figure 7B:
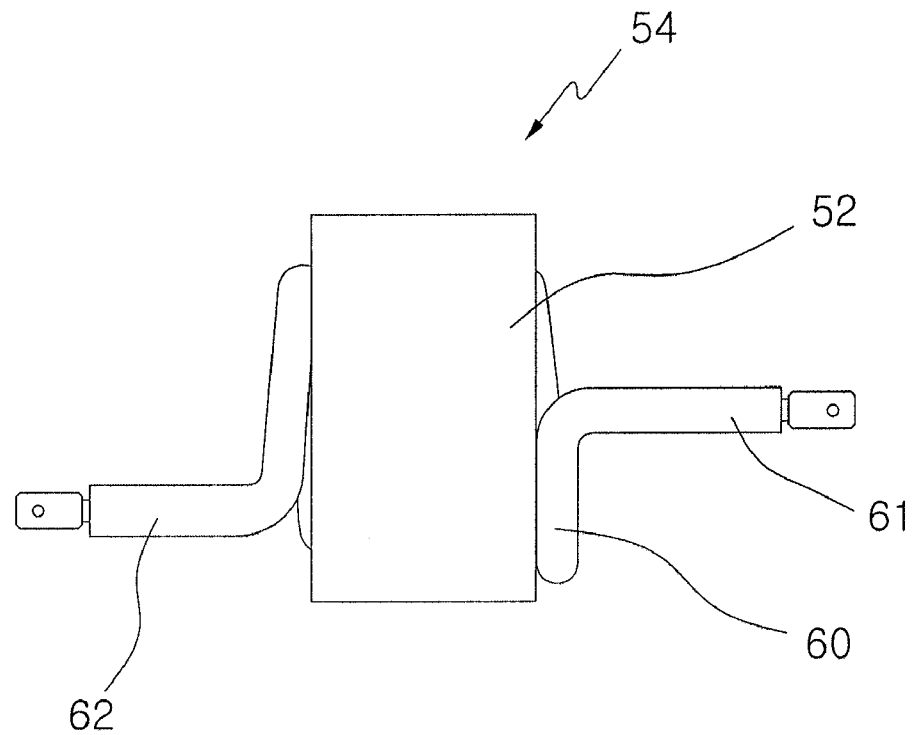
Figure 7C:
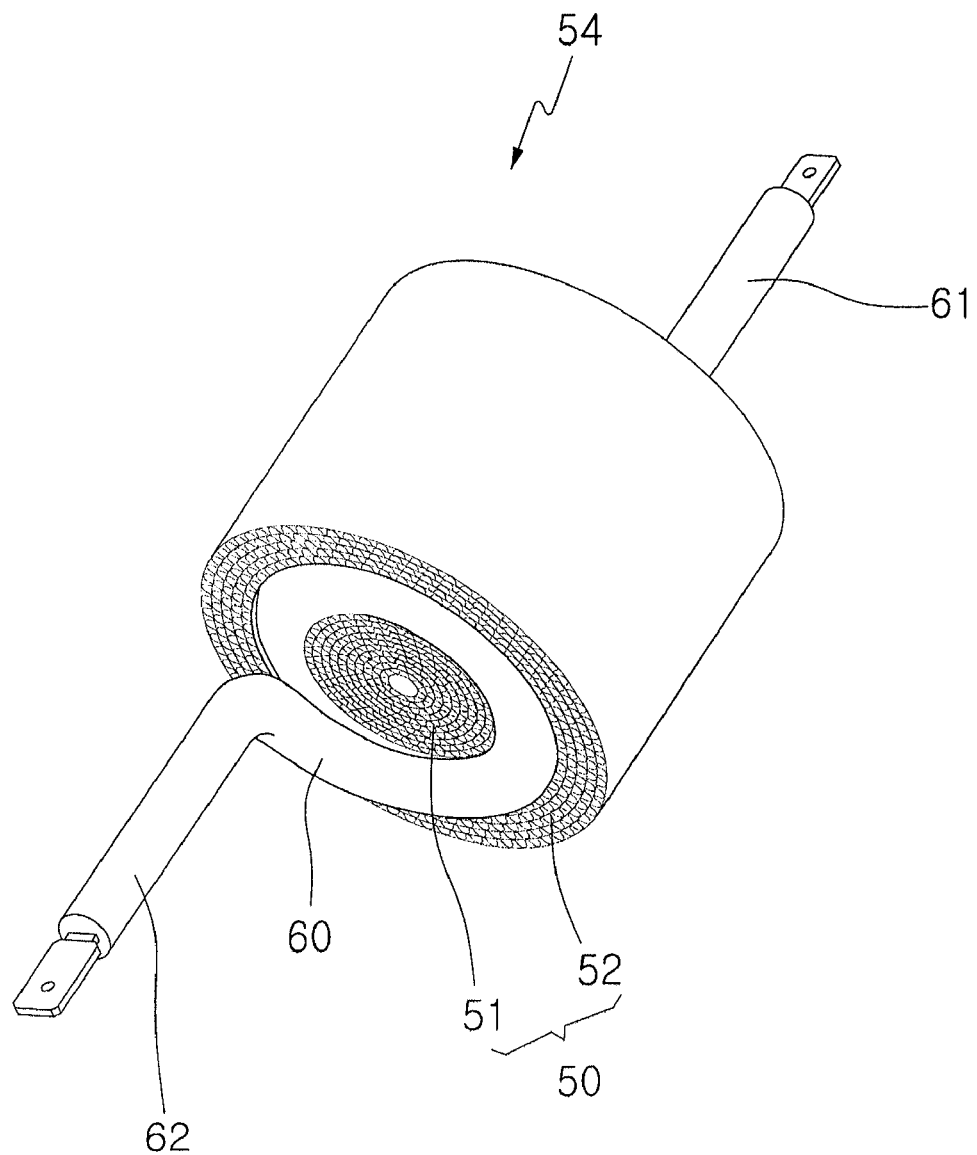
Figure 8:
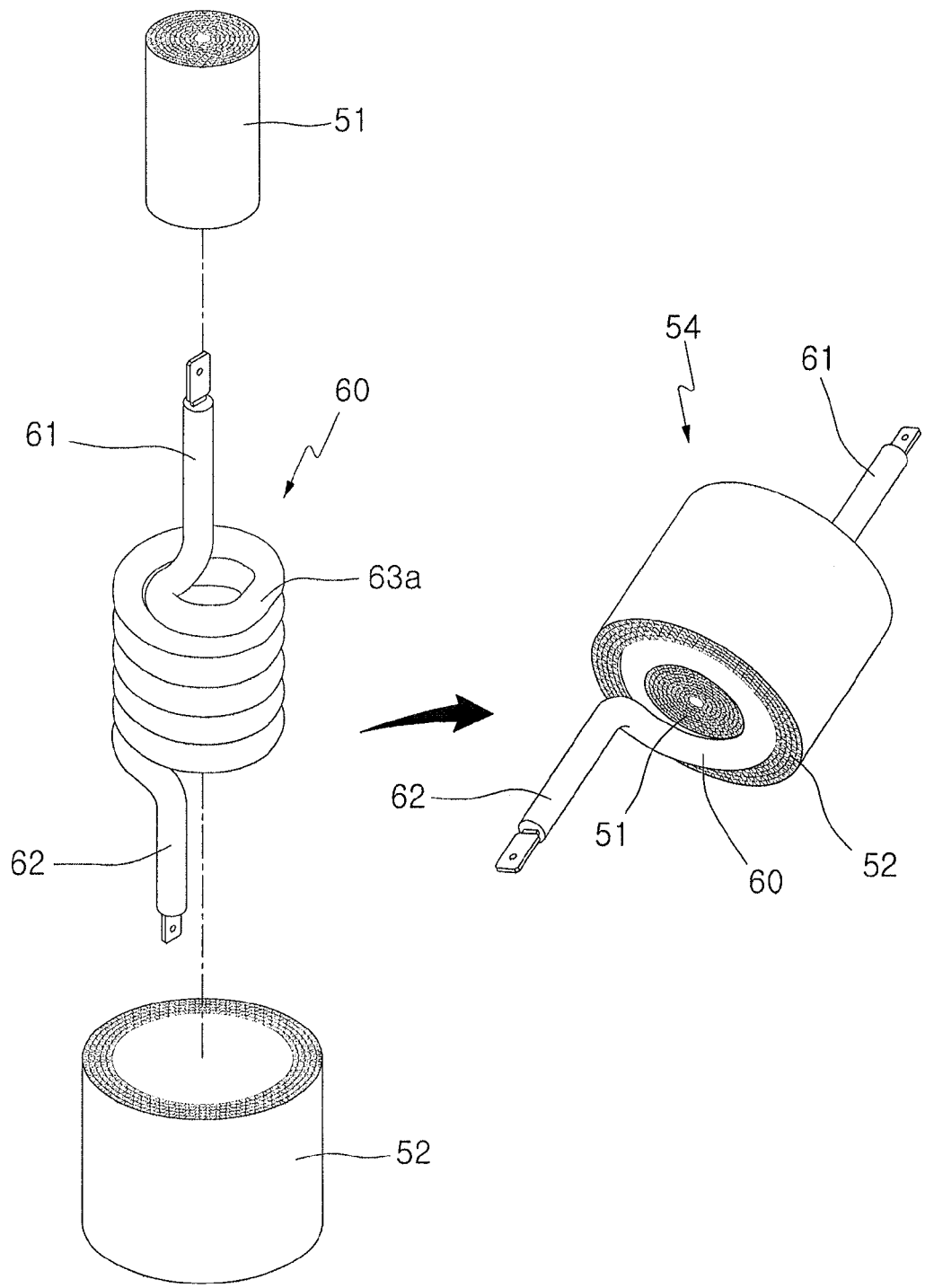
FIG. 8 is a perspective view to explain how to assemble a heater with a monolith called a catalyst support in a catalyst converter for purifying exhaust gas according to the fourth embodiment of this invention.

FIG. 6 is a cross-sectional view showing structure of a catalyst converter for purifying exhaust gas according to a fourth embodiment of this invention. FIGS. 7A through 7C are a side view, a front view and a perspective view showing a heater is combined with a monolith called a catalyst support for use in a catalyst converter for purifying exhaust gas according to the fourth embodiment of this invention, respectively. FIG. 8 is a perspective view to explain how to assemble a heater with a monolith called a catalyst support in a catalyst converter for purifying exhaust gas according to the fourth embodiment of this invention.

The catalyst converter 3c for purifying exhaust gas according to the fourth embodiment of this invention includes a housing 30, a heater 60 and a monolith or catalyst support 50.

A cylindrical space is provided in the inside of the housing 30, to accommodate the heater 60 and the catalyst support 50. In addition, in the case of the housing 30, an inlet pipe 22 through which exhaust gas is introduced and an exhaust pipe 24 through which the exhaust gas having passed through the catalyst support 50 to thus deodorize an offensive odor from the introduced exhaust gas are connected with an entrance 35 and an exit 36 near both sides thereof, respectively.

In addition, upper and lower caps 33 and 34 are pressed and combined with the upper and lower side ends of the housing 30, respectively. Throughholes 33a and 34a are formed at the center of the upper and lower caps 33 and 34, respectively, in order to withdraw both electric power terminals 61 and 62 of a heater 60, respectively.

In this case, an opened structure which may be coupled with a following processing unit may be employed without using the upper and lower caps 33 and 34 of the housing 30 according to need.

The heater 60 uses a sheath heater where a heating element is built in the inside of a metal tube, as a heat generator, and includes a winding portion 63a of FIG. 8 which is wound in a coil form having an inner space in the middle of the heater 60. It is desirable that the coil form is cylindrical.

However, the winding form of the winding portion 63a need not necessarily be cylindrical. For example, the winding portion 63a may be formed of a triangular shape or rectangular shape, in cross-section, or may be wound in various forms to have a truncated cone shape in cross-section whose internal space is gradually reduced toward the outlet. This form is not particularly limited and may be of course changed in any forms if a prescribed inner space may be formed in the heater 60.

Considering that an inner catalyst support 51 and an outer catalyst support 52 combined with the inside and outside of the winding portion 63a are formed or molded in a winding method, it is desirable that the winding portion 63a is cylindrically formed.

However, in the case that the inner catalyst support 51 and the outer catalyst support 52 are formed of a metal thin film, respectively, a certain amount of elastic deformation may occur even if they have been manufactured in a cylindrical winding method, respectively. Therefore, in the case that the winding portion 63a is formed of a rectangular column shape, and the inner catalyst support 51 and the outer catalyst support 52 are formed in a shape corresponding to that of the winding portion 63a, a contact area between the heater 60 and the catalyst supports 51 and 52 may be maximized.

The sheath heater has advantages that a temperature difference between the inner electric wires and the sheath may be sufficiently lowered, and the electric wires may not be deteriorated due to oxidation and may not be cut and eccentric due to impact, since the sheath heater is obtained by putting filaments at the center of various sheaths and putting high purity magnesium powder or aluminum oxide powder whose high temperature insulation degree is high and whose thermal conductivity is good between the filaments, and by compressing the outer diameter of the sheaths to then be integrated. In addition, the sheath heater has advantages that a manufacturing cost is inexpensive and a life of durability is excellent since both end portions of the filament are connected with the one side and the other side electric power terminals 61 and 62, respectively.

In addition, the other kinds of heaters that have the equivalent functions to that of the sheath heater may be used as a heating element material of the heater 60, other than the sheath heater.

Electric power for the heater 60 is applied between one side and the other side electric power terminals 61 and 62 which are extended in the axial direction from the winding portion 63a. Screw terminals, flat terminals or lug terminals may be used as both the electric power terminals 61 and 62.

In addition, the heater 60 may be implemented using cartridge heater of a flat terminal where a pair of electric power terminals 61 and 62 which are connected with the electric wires are disposed at one side thereof.

Hereinbelow, the heater 60 having the winding portion 63a of the cylindrical form will be described below as an example.

The monolith or catalyst support 50 includes an inner catalyst support 51 and an outer catalyst support 52. That is, the inner catalyst support 51 is a cylindrical catalyst support which is disposed inwards from the cylindrical winding portion 63a in the heater 60, and the outer catalyst support 52 is a cylindrical catalyst support which is disposed to surround the outer side of the winding portion 63a in the heater 60. For this, the inner catalyst support 51 is formed to have the outer diameter which is the same diameter as or smaller than the inner diameter of the winding portion 63a so as to be inserted into the inner side of the winding portion 63a of the heater 60.

Meanwhile, it is desirable that the outer catalyst support 52 is formed of a cylindrical shape so as to surround the outer side of the heater 60 including the inner catalyst support 51, and the heater 60 is inserted into the inside of the outer catalyst support 52. For this, the outer catalyst support 52 is formed to have the inner diameter which is the same diameter as or a little larger than the outer diameter of the winding portion 63a of the heater 60.

In addition, the inner catalyst support 51 is formed of a number of cells 50a of a honey comb form, in which a fluid transfer passage is formed in the lengthy direction of the cylinder. In addition, the outer catalyst support 52 is preferably formed of a number of cells 50a of a honey comb form in which a fluid transfer passage is formed in the lengthy direction of the cylinder.

For example, the monolith or the catalyst support 51 or 52 is formed of a material which is obtained by coating catalytic metal such as white gold, cobalt, nickel, palladium, rhodium or nano silver on a FeCrAl group heat resistant alloy thin plate having a thickness of 20-100 μm. A fusion welding is achieved in each and every contact where a corrugated wave plate 50c contacts the flat plate 50b. Then, the laminated plates are wound and the wound plates are formed of and molded in a circular column form or a cylindrical form, so that each cell 50a is of a honey comb structure.

The catalyst support 51 or 52 is established into a catalyst activation temperature of 200-600° C., for example, according to the kind of catalyst metal. Cells 50a formed in the catalyst support 51 or 52 may be formed of a semi-circular shape or triangle according to shape of the wave plate 50c. Here, the inner catalyst support 51 and the outer catalyst support 52 are made into various forms as well as the above-described honey comb structure.

It is desirable to use a Fecalloy alloy which is synthesized at a ratio of Fe-15Cr-5Al, or Fe-20Cr-5Al-REM (rare earth metal) (including about 1% of REM (Y, Hf, Zr)) as the FeCrAl group alloy material.

In addition, the monolith or catalyst support 51 or 52 includes a number of hollow cells made of ceramics and structure of a rectangular, or circular shape, as another honey comb structure.

Thus, according to the catalyst converter for purifying exhaust gas according to the fourth embodiment of this invention, the heater 60 and the catalyst support 50 may contact directly over a large area. Accordingly, a heat transfer efficiency and a catalyst reaction efficiency between the heater 60 and the catalyst support 50 become good. As a result, a high capacity heater of 350-450 W has been used in the conventional art, but a low capacity heater of 150 W or less may be used according to the fourth embodiment of this invention.

In addition, since the catalyst support 50 is conclusively heated at proper temperature with the minimum energy to thus process the exhaust gas, the whole energy of the exhaust gas exhausted via the exit 36 of the housing 30 is also low. Accordingly, drive of a suction motor for introducing outdoor air may be minimized in order to lower temperature of exhaust gas.

Also, the winding portion 63a of the heater 60 is inserted and formed in the middle of the catalyst support 50, it is possible to minimize size of the catalyst converter for purifying exhaust gas. As a result, in the case of the structure that the winding portion of the conventional heater is arranged at the outside of the catalyst support 50, the winding portion 63a of the heater 60 is 190 mm long, but the length of the winding portion 63a of the heater 60 may be greatly reduced into 110 mm according to the present invention.

Hereinbelow, a method of manufacturing a catalyst converter for purifying exhaust gas having the above-described structure will be described with reference to FIG. 8.

First, a heating element made of a sheath heater is wound in the form of a cylindrical shape, to thus form a winding portion 63a and electric power terminals 61 and 62 are extended and formed at both ends of the winding portion 63a in a straight line form, to thereby manufacture a heater 60.

In addition, in the case of the catalyst support 50, the inner catalyst support 51 is formed or molded in a cylindrical form by brazing (or diffused junction) a corrugated wave plate 50c on a flat plate 50b in each and every contact, and winding the brazed plates, and the outer catalyst support 52 is formed or molded in a cylindrical form by brazing (or diffused junction) a corrugated wave plate 50c on a flat plate 50b in each and every contact, and winding the brazed plates, using a material that catalyst metal has been coated on a heat resistant alloy thin plate. Each cell 50a is formed of a honey comb structure for example.

That is, the inner catalyst support 51 is prepared by being fabricated in a cylinder form having the substantially same diameter as the inner diameter of the winding portion 63a of the heater 60. In addition, the outer catalyst support 52 is prepared by being fabricated in a cylinder form having the inner diameter which is same as the outer diameter of the winding portion 63a of the heater 60, and simultaneously having the outer diameter which is same as the inner diameter of the housing 30 of the heater 60, in the catalyst converter for purifying exhaust gas into which the heater 60 is inserted.

As illustrated on the left side of FIG. 8, if the respective parts have been prepared, the inner catalyst support 51 is inserted into the inside of the winding portion 63a of the heater 60, and the outer catalyst support 52 is fitted into the outer side of the winding portion 63a of the heater 60. Accordingly, as shown on the right side of FIG. 8, an assembly of the heater 60 and the catalyst support 50 is completed.

Thereafter, contact portions between the inner and outer catalyst supports 51 and 52 and the winding portion 63a of the heater 60 are vacuum-brazed to then be integrated, or the inner and outer catalyst supports 51 and 52 and the winding portion 63a of the heater 60 are brazed separately, to then assemble the brazed inner and outer catalyst supports 51 and 52 and winding portion 63a of the heater 60 to thereby complete a catalyst support 50. In this case, it is possible to use a diffused junction method instead of the brazing method.

Then, a support assembly 54 where the catalyst support 50 and the heater 60 have been assembled is inserted into the housing 30, thereby accomplishing a fixing operation between the support assembly 54 and the housing 30 by brazing.

Thereafter, if the upper and lower caps 33 and 34 are compressively combined with the upper and lower ends of the housing 30, both the electric power terminals 61 and 62 of the heater 60 are withdrawn through the throughholes 33a and 34a of the upper and lower caps 33 and 34, to then be sealed.

As described above, the catalyst converter for purifying exhaust gas according to this invention may be assembled by a simple assembly of the respective components. The assembled catalyst converter may be miniaturized into length of about half (½) when compared with the conventional case, and thus has the advantage applicable in various designs.

In addition, as described above, heat is transferred from the heater to the monolith (or the catalyst support) by a conduction method, to thereby realize minimization of a heat transfer efficiency and minimization of electric power consumption. Accordingly, minimization of exhaust gas temperature may be obtained to thereby minimize operation of a suction motor for introducing outdoor air and curtail a maintenance cost.

Figure 9:
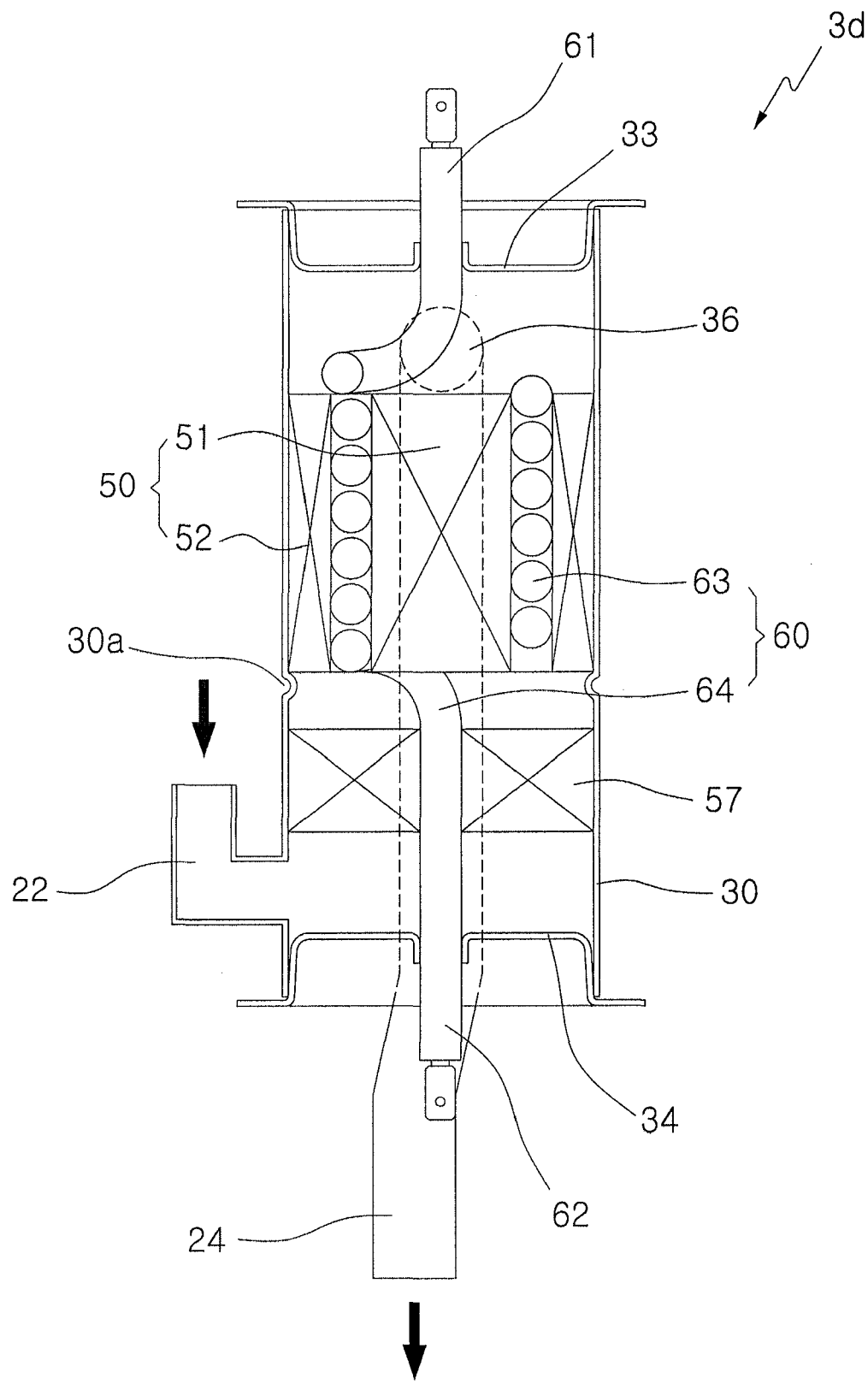
FIG. 9 is a cross-sectional view showing structure of a catalyst converter for purifying exhaust gas according to a fifth embodiment of this invention.
Figure 10:
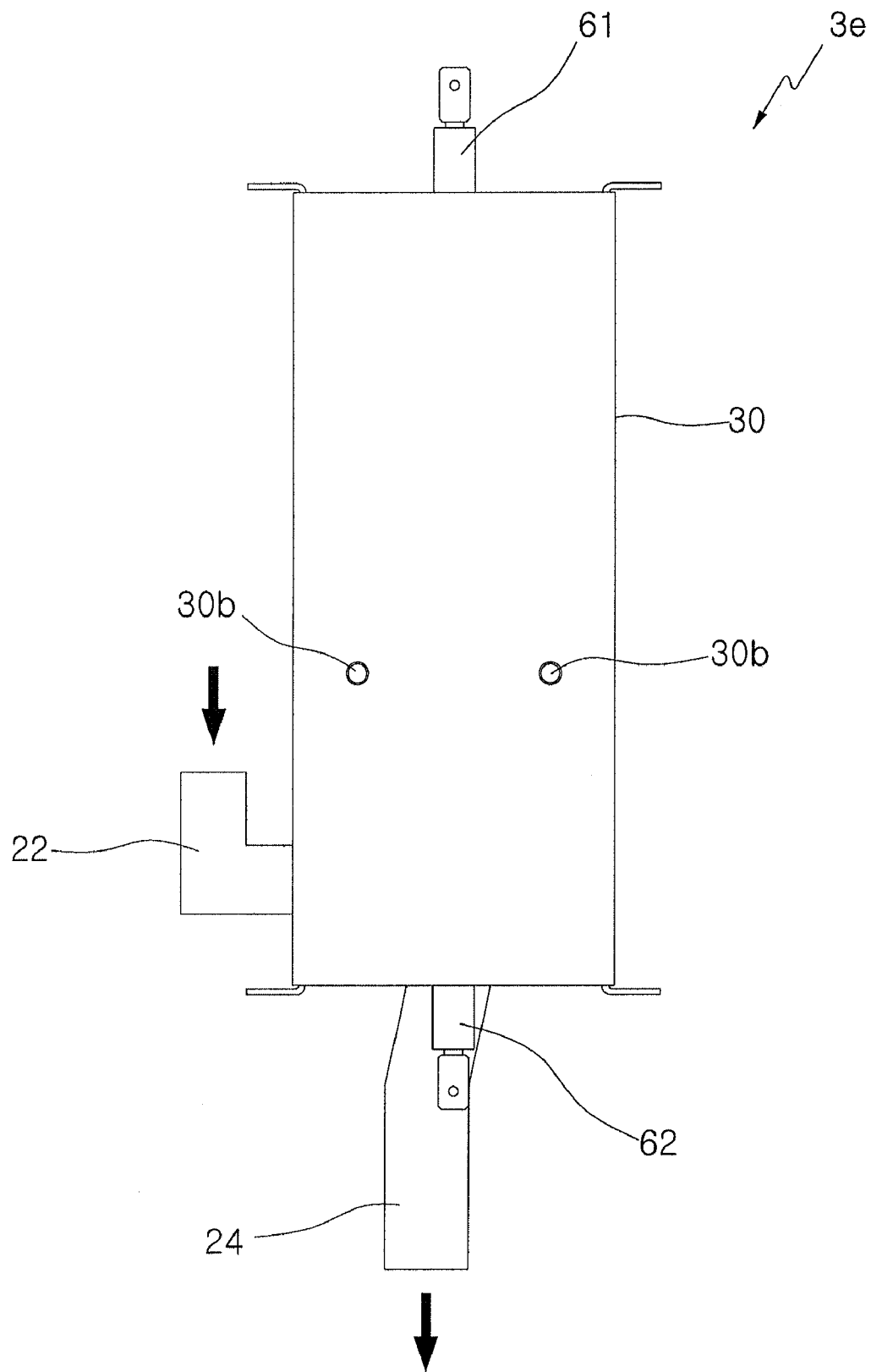
FIG. 10 is a front view showing structure of a catalyst converter for purifying exhaust gas according to a sixth embodiment of this invention.

Meanwhile, FIG. 9 is a cross-sectional view showing structure of a catalyst converter for purifying exhaust gas according to a fifth embodiment of this invention, and FIG. 10 is a front view showing structure of a catalyst converter for purifying exhaust gas according to a sixth embodiment of this invention.

The catalyst converter for purifying exhaust gas according to the fifth and sixth embodiments of the present invention is shown in FIGS. 9 and 10, respectively, and has a structure similar to that of the fourth embodiment according to the present invention. Thus, equal elements are assigned with the equal reference numerals, and the detailed description thereof will be omitted.

The catalyst converter according to the fifth and sixth embodiments of the present invention differs from the fourth embodiment according to the present invention, in a point of view that a distributer 57 is additionally provided at the entrance side of the housing 30 through which exhaust gas is introduced, respectively.

The distributer 57 is of a structure of improving a flow path so that the exhaust gas (that is, reaction gas) introduced into the housing 30 can be uniformly dispersed and can be made to pass through all the cells of the catalyst support 50 that is located at the rear end thereof, to thus attain an oxidation reaction with the catalyst.

The distributer 57 is formed of a number of cells in a honey comb structure so as to form a path of a flow in the lengthy direction of the housing in the same manner as that of the catalyst support 50 at the rear end thereof, but a catalyst may be coated or not be coated on the surface of each cell.

In this case, the distributer 57 is established to have a number of cells of the honey comb structure in the range of 50-1200 cpsi (cell per square inch), and may be set in the range of 1-100 mm in length.

A linear filament which generates heat at a relatively low temperature is disposed at a connector 64 which is connected from the winding portion 63 of the heater 60 to the electric power terminal 62, instead of a coil style filament which generates heat at a high temperature in the inside of the sheath heater. Therefore, in the case that no catalyst is not coated on the distributer 57, the connector 64 which is heated at a low temperature is established to be combined with the distributer 57. Accordingly, the high temperature heat emission of the heater is suppressed to be the minimum at a place where a thermal efficiency is low.

A coupling structure of the catalyst support 50 and the heater 60 in the respective fifth and sixth embodiments of the present invention is same as that of the fourth embodiment of the present invention. Thus, the detailed description of the coupling structure of the catalyst support 50 and the heater 60 in the respective fifth and sixth embodiments of the present invention will be omitted.

Meanwhile, when the support assembly 54 is assembled in the inside of the housing 30 in the respective fifth and sixth embodiments of the present invention, a detachably coupling structure is employed instead of a brazing fixture method which is employed in the fourth embodiment of the present invention. The coupling structure of the catalyst support 50 and the heater 60 is same between the respective fifth and sixth embodiments of the present invention, but only a supporting structure of the catalyst support 50 to be described later differs therebetween.

That is, the outer circumferential portion of the housing 30 is caulked so that an annular protrusion 30a is protruded in the inner circumferential portion of the housing 30 which corresponds to the lower end of the catalyst support 50, to thus form a groove. In this case, the support assembly 54 which has been assembled in the housing 30 may not move downwards in the gravitational direction.

In addition, when the support assembly 54 where the catalyst support 50 and the heater 60 have been assembled is inserted into and assembled with the housing 30, an insulation seat such as a ceramics seat or mat is inserted and assembled between the support assembly 54 and the housing 30. Accordingly, the heater 60 may be maintained and thermally insulated at a position where the heater 60 has been assembled in the inside of the housing.

In the sixth embodiment that is illustrated in FIG. 10, in order to implement a detachable coupling between the support assembly 54 and the housing 30, and intercept the support assembly 54 from moving downwards in the gravitational direction, a number of tiny semi-spherical protrusions 30b are formed at the inner circumferential portion of the housing 30.

Also, when the support assembly 54 is inserted into and assembled with the housing 30, an insulation seat such as a ceramics seat or mat is inserted and assembled between the support assembly 54 and the housing 30. Accordingly, the heater 60 may be maintained and thermally insulated at a position where the heater 60 has been assembled in the inside of the housing.

Accordingly, in the fifth and sixth embodiments of the present invention, the support assembly 54 may be easily assembled in the housing. In addition, when the support assembly is required for replacement, dismantling for replacement may be easily performed from the housing 30.

In the fifth and sixth embodiments of the present invention, a structure that the support assembly 54 is detachably assembled in the housing 30 may be identically applicable in the fourth embodiment of the present invention. In addition, such a structure that the support assembly 54 is detachably assembled in the housing 30 may be identically applicable at the time of supporting a catalyst support of a seventh embodiment of the present invention which will be described later.

Figure 11:
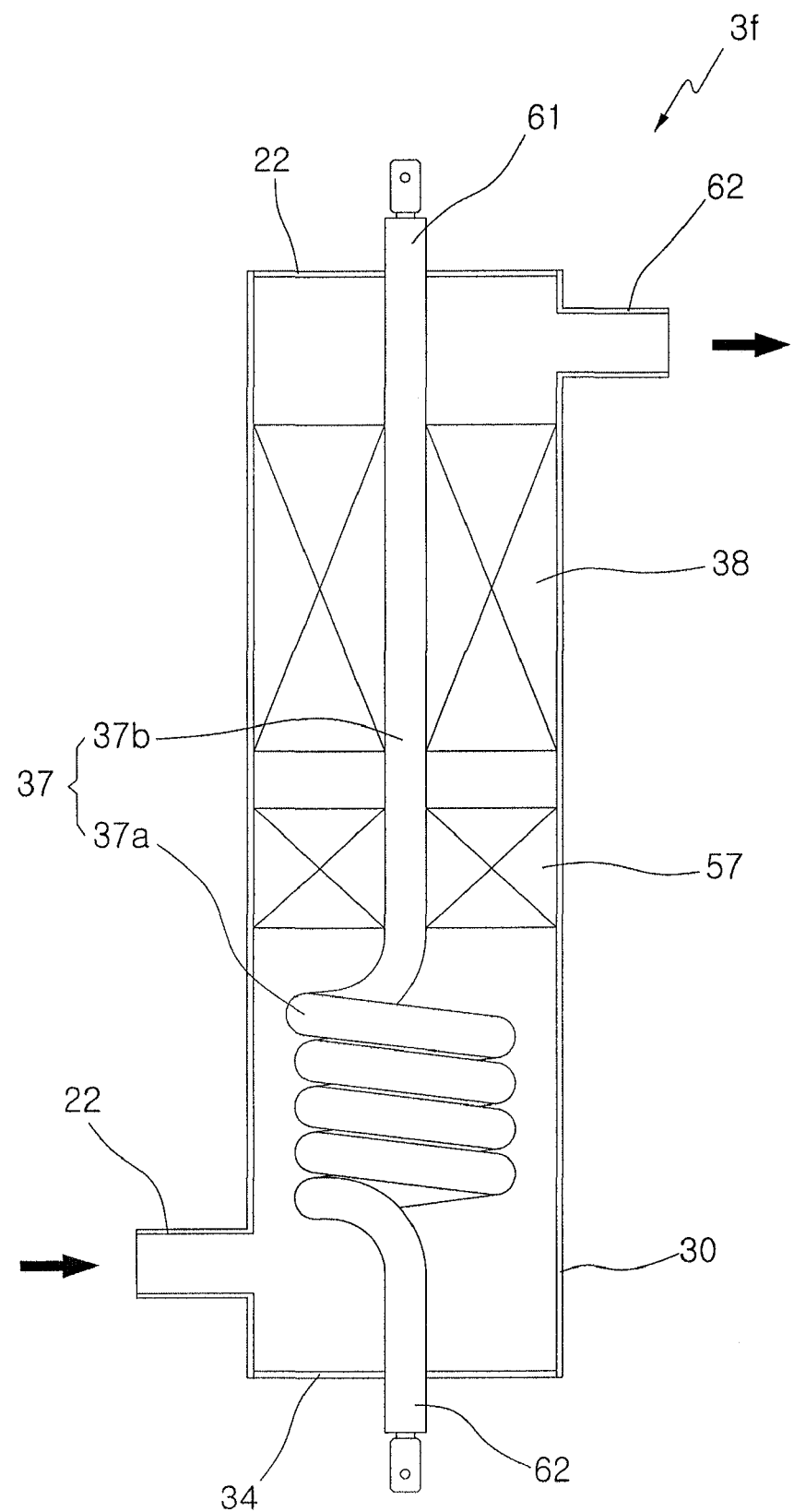
FIG. 11 is a cross-sectional view showing structure of a catalyst converter for purifying exhaust gas according to a seventh embodiment of this invention.

Meanwhile, FIG. 11 is a cross-sectional view showing structure of a catalyst converter for purifying exhaust gas according to a seventh embodiment of this invention.

The catalyst support 38 according to the seventh embodiment of the present invention is formed of a support on the surface of respective cells of which a catalyst has been coated so as to have a single body of a cylinder form. The heater 37 is formed of a cylindrical winding portion 37a and a straight line portion 37b.

In addition, in the seventh embodiment, the cylindrical winding portion 37a of the heater 37 is arranged at the entrance side of the housing 30 and the straight line portion 37b of the heater is combined at the central portion of the distributer 57 and the catalyst support 38 which are sequentially disposed at a distance therebetween.

Moreover, electric power terminals 61 and 62 extended from the heater 60 are withdrawn to the outside of the housing 30 through the upper and lower caps 33 and 34.

Therefore, the straight line portion 37b of the heater 37 is inserted into and fixed to the central portion of the catalyst support 38. Accordingly, direct heating is applied for the catalyst support 38 and indirect heating is applied for the cylindrical winding portion 37a which is arranged at the entrance side of the housing 30.

The distributer 57 is of a structure of improving a flow path so that the exhaust gas (that is, reaction gas) introduced into the housing 30 can be uniformly dispersed and can be made to pass through all the cells of the catalyst support 50 that is located at the rear end thereof, to thus uniformly attain an oxidation reaction with the catalyst.

Hereinbelow, a structure of heightening a reaction efficiency by increasing a contact time when exhaust gas passes the catalyst support of the catalyst converter will be described with reference to FIGS. 12 through 15.

Figure 12:
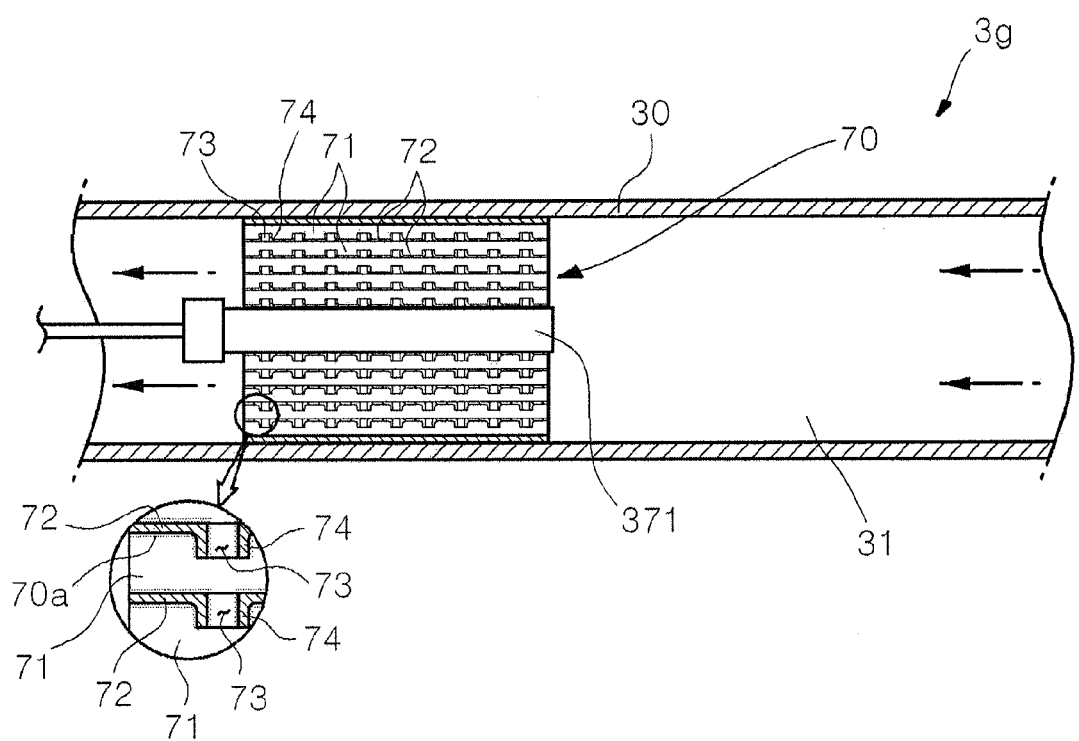
FIG. 12 is a cross-sectional view showing structure of a catalyst converter for purifying exhaust gas according to an eighth embodiment of this invention.
Figure 13:
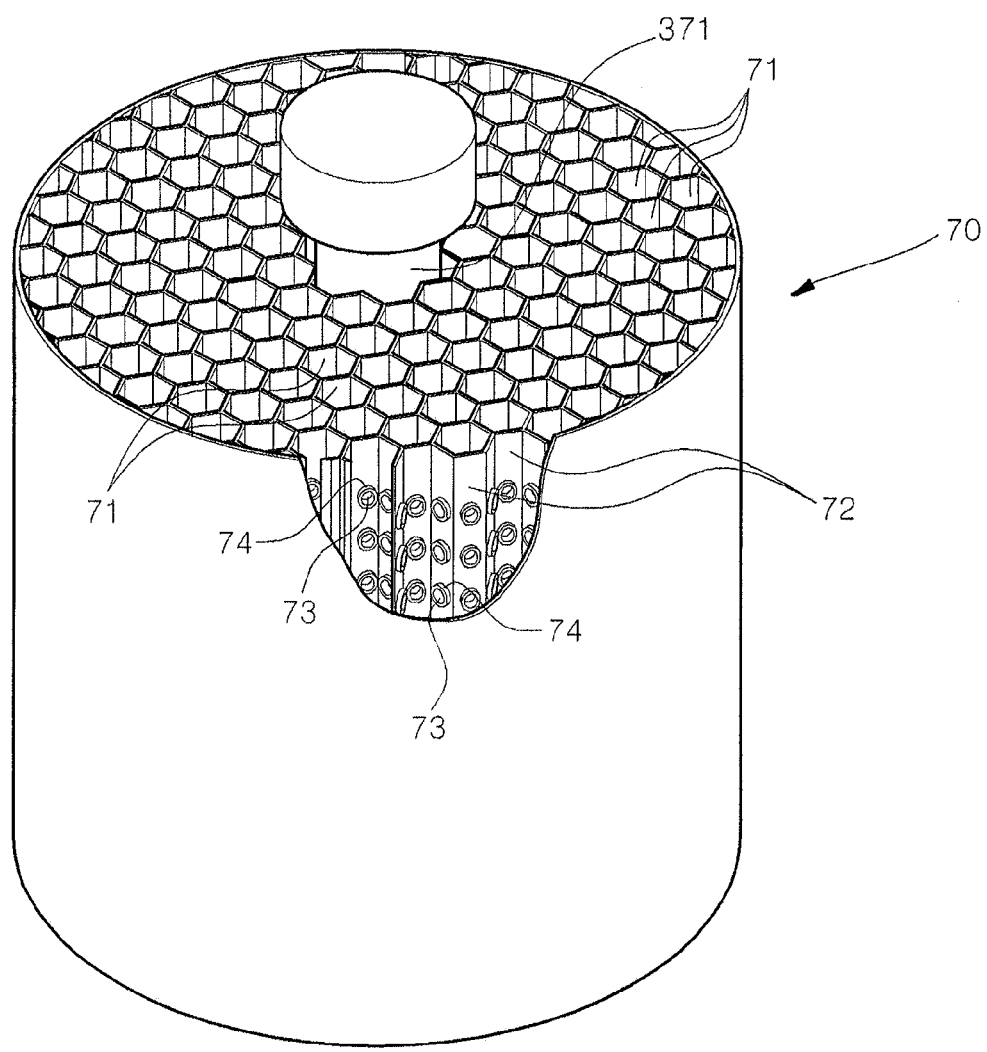
FIG. 13 is a perspective view showing an example of the catalyst converter according to the eighth embodiment illustrated in FIG. 12.
Figure 14:
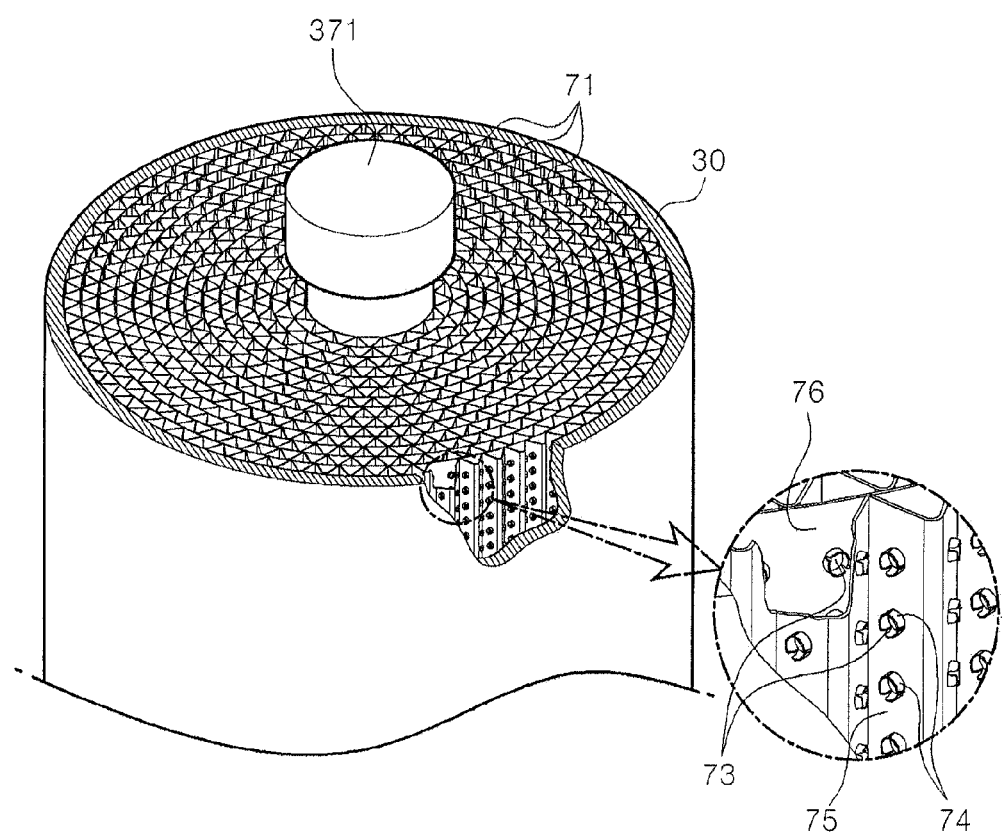
FIG. 14 is a perspective view showing another example of the catalyst converter according to the eighth embodiment illustrated in FIG. 12.
Figure 15:
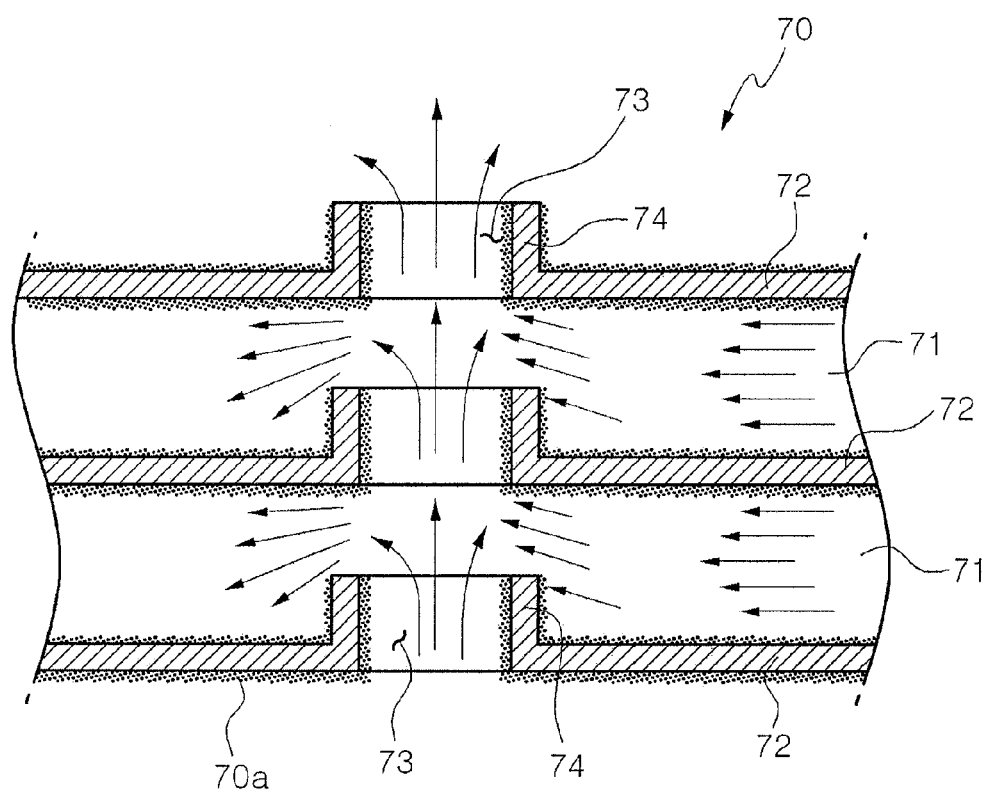
FIG. 15 is an enlarged cross-sectional view showing the catalyst converter illustrated in FIG. 14.
Figure 16:
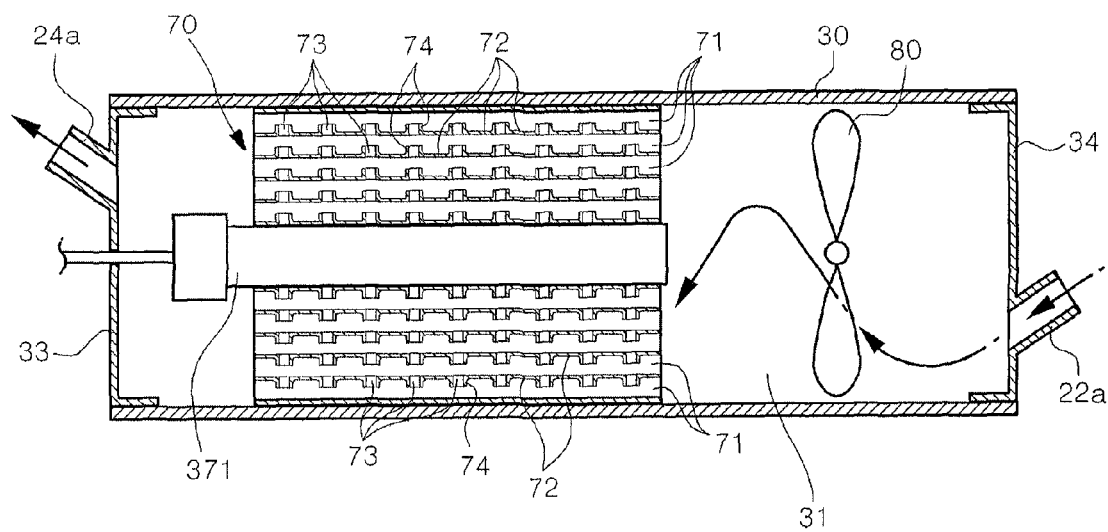
FIG. 16 is a cross-sectional view showing structure that an impeller for forming an eddy flow is added in the catalyst converter according to the eighth embodiment of the present invention.

FIG. 12 is a cross-sectional view showing structure of a catalyst converter for purifying exhaust gas according to an eighth embodiment of this invention. FIG. 13 is a perspective view showing an example of the catalyst converter according to the eighth embodiment illustrated in FIG. 12. FIG. 14 is a perspective view showing another example of the catalyst converter according to the eighth embodiment illustrated in FIG. 12. FIG. 15 is an enlarged cross-sectional view showing the catalyst converter illustrated in FIG. 14. FIG. 16 is a cross-sectional view showing structure that an impeller for forming an eddy flow is added in the catalyst converter according to the eighth embodiment of the present invention.

As illustrated in FIGS. 12 through 16, a catalyst converter 3g for purifying exhaust gas according to the eighth embodiment of this invention includes a catalyst support 70 in the inside of the housing 30 where a flow path through which a fluid or exhaust gas flows in one direction of the deodorization chamber 31 is formed.

The catalyst support 70 is made of metal for example, and penetrates toward the flow path. In addition, the catalyst support 70 is formed of a number of hollow cells 71 that are partitioned by outer walls 72, and a reaction catalyst 70a is coated on the surface of each cell. In addition, a number of communication holes 73 which communicate from the respective cells 71 which have been partitioned by the outer walls 72 are formed in the respective surfaces of the outer walls 72.

The reaction catalyst 70a is coated on the inner circumferential surface of the communication holes 73 and the inner and outer side surfaces of protruding portions 74 to be described later, in which white gold, cobalt, nickel, etc., may be used as the catalyst metal that can lower the combustion temperature of exhaust gas.

In addition, as illustrated in FIG. 13, the catalyst support 70 includes for example, a number of cells 71 of a hexagonal shape having a honey comb structure. Any cell structure of partitioning a number of the cells 71 partitioned into a number of hollow cells 71 by a number of the outer walls 72, and making a fluid introduced into the housing 30 pass through the cells may be used.

The honey comb structure has a big intensity in view of a structure. The honey comb structure makes a fluid pass through the cells smoothly, and simultaneously has a wide surface area, to thus drive a reaction through a contact with the fluid that passes the cells 71.

Also, the cells 71 may be formed in various shapes such as a triangle, a rectangle, a hexagon, a circle, a waveform, etc., in the case that the cells 71 are made of a ceramics support according to shape and usage of the housing 30, and when size of the cells 71 and thickness of the outer wall 72 are preferably determined at the time of designing according to usage.

The cells 71 communicate with other cells 71 through a number of the communication holes 73 formed in the outer walls 72 which partition the cells 71. The fluid passes through the cells 71 of the catalyst support 70 in the housing 30, and is introduced into the respective cells 71 through the communication holes 73, to thus partially circulate in and then pass through the catalyst support 70.

Also, as illustrated in FIG. 14, the catalyst support 70 is formed of a metal plate. In this case, the catalyst support 70 may be formed by corrugating the metal plate so that peaks and gulleys are repeated in a continuous waveform, and simultaneously by laminating a number of wave plates 75 in which a number of the communication holes 73 are perforated, with a number of flat plates 76 in which a number of the communication holes 73 are perforated, while partitioning the wave plates 75.

The wave plates 75 are formed so that peaks and gulleys are repeated in a continuous waveform, respectively, to thus widen a heat exchange area and a catalyst contact area. In addition, the wave plates 75 and the flat plates 76 are respectively fabricated using a metal plate whose thermal conductivity is high.

The communication holes 73 of the flat plates 76 are perforated so as to be located within the peaks and gulleys of the wave plates 75, respectively. Accordingly, it is desirable to have the communication holes 73 of the flat plates 76 uniformly communicate with a number of the cells 71 that is formed in each peak and gulley.

The cells 71 of the catalyst support 70 is formed in the peaks and gulleys of the wave plates 75. Each cell 71 communicates through the communication hole 73. In this case, the cells 71 of the catalyst support 70 may be formed of a semi-circular or triangular shape, according to shape of the wave plates 75.

The wave plate 75 and the flat plate 76 are laminated and the laminated plates are wound in a spiral form around the heater 371 which is inserted into the center thereof. Besides, any structure which is manufactured by laminating the wave plate 75 and the flat plate 76 may be applicable in the present invention.

As described above, the fluid is partially circulated in the catalyst support 70 and then passes through the catalyst support 70, to thus increase a contact time and a contact area with the reaction catalyst 70a which has been coated on the surface of the catalyst support 70, and to thereby enhance a reaction effect.

Also, it is desirable that protruding portions 74 that are protruded toward the inside of the cells 71 are formed at the communication holes 73, respectively.

The communication holes 73 and the protruding portions 74 disturb flow of the fluid that passes through the cells 71, to thus make the fluid circulate each other in the space of each cell 71 through the communication holes 73. As illustrated in FIG. 15, the fluid which passes through the cells 71 strikes with the protruding portions 74 and thus circulates in the spaces of the other cells 71 more smoothly. Further, due to a contact with the protruding portions 74, a contact time and a contact area with the reaction catalyst 70a are further increased.

Moreover, it is desirable that the protruding portions 74 is formed of a burr structure. The burr is protruded and formed when the outer wall 72 of the cell 71 is torn to then perforate the communication hole 73. The end of the burr is irregular and rough, and disturbs the flow of the fluid which passes through the cell 71 irregularly to thus form an eddy flow, and thereby further increase an amount of the fluid which circulates in the inside of the catalyst support 70.

The protruding portion 74 is protruded in various directions toward the inside of the cell 71, to thereby make the fluid circulate in the catalyst support 70 in various directions and then discharged smoothly. The protruding portion 74 may be implemented in various forms considering usage and structure of the other structures at design.

Meanwhile, an electric heater 371 that heats the fluid that passes through the catalyst support 70 to the catalyst activation temperature (LOT; Light-off Temperature) is installed in the housing 30. The heater 371 is provided in the case that temperature of the fluid which passes through the housing 30 is low. The heater 371 may not be provided in the inside of the housing 30 through which a fluid of high temperature passes.

In addition, the heater 371 includes electric wires which are inserted into the outer wall 72 of the catalyst support 70 although the electric wires are not shown in the drawings, to thus heat the catalyst support 70 by heat emitted from the electric wires.

Moreover, the heater 371 may be replaced by forming the wave plate 75 as a surface heat generation metal plate to which electric power is applied to emit heat. The wave plate 75 emits heat by itself and transfers the heat to the flat plate 76 to thereby heat the fluid that passes through the catalyst support 70.

It is desirable that the surface heat generation metal plate is made of a FeCrAl group alloy material which is same as the catalyst support of the first embodiment of the present invention, and an insulation layer is formed on the surface of the surface heat generation metal plate.

Any structure that the heater 371 is integrated with the catalyst support 70 to then heat the catalyst support 70 may be used as the heater 371, other than the above-described structure.

The fluid that passes through the housing 30 passes through the catalyst support 70, and is simultaneously uniformly heated by the catalyst support 70 whose contact area is wide, and quickly heated up to the catalyst activation temperature.

After the fluid has been heated, the fluid reacts with the reaction catalyst 70a immediately.

The heater 371 heats the catalyst support 70 and heats the fluid which passes through the cell 71 directly, to thus enhance a heating effect and a reaction effect simultaneously in comparison with the case that the heater is separately installed at the entrance side of the catalyst support 70.

Meanwhile, an impeller 40 that deforms a flow of the internal fluid, that is, the fluid at the entrance side through which the exhaust gas is introduced, into an eddy flow, is installed in the housing 30 as illustrated in FIG. 16.

Since the fluid flows in an eddy flow form by the impeller 40 and passes through the catalyst support 70 to then circulate each cell 71 through communication holes 73 in the catalyst support 70, a contact time and a contact area that the fluid contacts the reaction catalyst 70a in the catalyst support 70 are increased, to accordingly enhance a reaction effect.

A fluid inlet pipe 22a is provided at one end of the housing 30. A first cap 34 that covers an end portion is provided at one end of the housing 30. An inclined fluid outlet pipe 24a is provided at the other end of the housing 30. A second cap 34 that covers an end portion is provided at the other end of the housing 30.

The fluid inlet pipe 22a of the first cap 34 makes the fluid introduced into the inside of the housing 30, in an inclined direction, to thus deform the fluid into an eddy flow, and guides the fluid to be introduced into the housing 30 more smoothly according to a pressing action by rotation of the impeller 40.

The fluid exhaust pipe 24a is provided slantingly in the flow direction of the fluid that passes through the catalyst support 70, to thus discharge the fluid which flows in an eddy flow form in the housing 30 smoothly.

The fluid that is introduced into the inside of the housing 30 flows in an eddy flow form by the fluid inlet pipe 22a and rotation of the impeller 40, and passes through the catalyst support 70 to then circulate each cell 71 smoothly through the communication holes 73 in the catalyst support 70. Accordingly, a contact time and a contact area that the fluid contacts the reaction catalyst 70a in the catalyst support 70 are further increased, to accordingly enhance a much higher reaction effect.

The catalyst converter 3g for purifying exhaust gas according to the eighth embodiment of this invention makes exhaust gas pass through the catalyst support 70 on the surface of which a combustion catalyst has been coated as a reaction catalyst 70a, to thereby burn an offensive odor component for example ammonia, hydrogen sulfide, mercaptan, etc., and to thus decompose and remove an offensive odor included in the exhaust gas. If exhaust gas passes through the communication holes 73 in the catalyst support 70, the exhaust gas circulates each cell 71 through the communication holes 73 in the catalyst support 70, to thus enlarge a contact time and a contact area that the exhaust gas contacts the deodorization catalyst 70a in the catalyst support 70, and to accordingly enhance an excellent deodorization effect.

The structure of forming a number of communication holes 73 which communicate with the hollow cells in the catalyst support 70 according to the eighth embodiment of the present invention may be applicable in the catalyst supports 38 and 50 according to the first to seventh embodiments of the present invention.

Meanwhile, the catalyst converter for purifying exhaust gas according to this invention can be used to a device for removing an offensive odor included in exhaust gas which is generated from a food trash processing device, and can be used as a device for purifying exhaust gas exhausted from an automotive internal combustion engine as well.

Also, the catalyst converter for purifying exhaust gas according to this invention can be used as a catalytic reaction device which obtains a reaction to be obtained through a contact with a catalyst as in a fuel cell reformer, in addition to the catalyst converter for purifying exhaust gas.

In general, a lot of hazardous substances such as carbon monoxide, hydrocarbon, and nitrogen oxide are included in the exhaust gas exhausted from the automobile engine. Also, more hazardous substances are included by imperfect combustion at the initial time of starting the vehicle engine. Therefore, when exhaust gas passes through the catalyst support before the catalyst support has been sufficiently heated, hazardous substances have not been effectively removed.

Since the catalyst converter for purifying exhaust gas according to this invention employs an electric heater, the catalyst support may be quickly heated as soon as the vehicle engine starts. Thus, when exhaust gas including hazardous gases exhausted from the vehicle engine passes through the catalyst converter, an oxidation reaction of the exhaust gases with the catalyst is effectively achieved, to thereby remove harmful matters.

MODE FOR INVENTION

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

INDUSTRIAL APPLICABILITY

This invention is applied to a catalyst converter for purifying exhaust gas including an offensive odor gas of a food trash processing device for processing food trashes including an offensive odor or automobile exhaust gas including hazardous substances such as carbon monoxide, nitrogen oxide, and hydrocarbon (HC).

The invention claimed is:

1. A catalyst converter for purifying exhaust gas, the catalyst converter comprising:
   a heater having a winding portion which is wound so as to have a space therein and a pair of electric power terminals which are extended to both sides from the winding portion;
   an inner monolith called a catalyst support which is inserted in an inner circumferential portion of the heater winding portion wherein the inner monolith comprises a number of hollow cells on surfaces of which a catalyst has been coated and which are formed in a lengthy direction;
   an outer monolith called a catalyst support which is inserted in an outer circumferential portion of the heater winding portion wherein the outer monolith comprises a number of hollow cells on surfaces of which a catalyst has been coated and which are formed in the lengthy direction; and
   a housing which comprises an inlet through which the exhaust gas to be processed is introduced and an outlet through which processed exhaust gas is exhausted near both side ends thereof, wherein a support assembly where the inner monolith and the outer monolith are assembled in inside/outside of the heater winding portion is assembled in the housing.

2. The catalyst converter according to claim 1, wherein a cross-section of the winding portion of the heater is formed of any one form among a circle, a square, and a triangle.

3. The catalyst converter according to claim 1, wherein a number of the hollow cells in the inner and outer monoliths are formed of a horny comb form, a semicircular form or a triangle form.

4. The catalyst converter according to claim 1, wherein when the catalyst converter is applied to a food trash processor, the former is installed in the latter in a perpendicular direction,
 wherein the support assembly is detachably assembled in the inside of the housing, and comprises an annular protrusion or a number of small size protrusions in the inner circumferential portion of the housing in order to hinder the support assembly from moving by gravity.

5. The catalyst converter according to claim 1, wherein the inner and outer catalyst supports comprise a number of communication holes which communicate with the respectively adjoined hollow cells.

6. The catalyst converter according to claim 1, further comprising a distributer which is arranged at the entrance side of the housing through which exhaust gas is introduced, and disperses the exhaust gas introduced into the inside of the housing, and supplies evenly to the catalyst support that is located at the rear end thereof.

7. The catalyst converter according to claim 1, wherein the monolith called a catalyst support is a laminated body obtained by laminating a corrugated wave plate on a flat plate, and then winding the laminated plates in a spiral form, and wherein the flat plate and the wave plate are obtained by coating catalyst metal on a FeCrAl based alloy thin plate.

* * * * *